(12) United States Patent
Yano et al.

(10) Patent No.: US 9,495,033 B2
(45) Date of Patent: Nov. 15, 2016

(54) DISPLAY DEVICE WITH TOUCH PANEL

(71) Applicant: Konica Minolta, Inc., Tokyo (JP)

(72) Inventors: Kentaro Yano, Tokyo (JP); Hiroshi Bekku, Tokyo (JP); Satoshi Okano, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/418,369

(22) PCT Filed: Aug. 29, 2013

(86) PCT No.: PCT/JP2013/073143
§ 371 (c)(1),
(2) Date: Jan. 29, 2015

(87) PCT Pub. No.: WO2014/038466
PCT Pub. Date: Mar. 13, 2014

(65) Prior Publication Data
US 2015/0301667 A1 Oct. 22, 2015

(30) Foreign Application Priority Data

Sep. 6, 2012 (JP) ................................ 2012-195832

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01)

(58) Field of Classification Search
CPC ... G06F 3/041; G06F 3/04883; G06F 3/0488
See application file for complete search history.

(56) References Cited

U.S. PATENT DOCUMENTS

| 2008/0113119 A1* | 5/2008 | Tsujiuchi | G02B 1/105 428/1.31 |
| 2009/0310218 A1* | 12/2009 | Hane | C08J 7/047 359/485.01 |
| 2013/0241862 A1* | 9/2013 | Kim | C09J 7/0246 345/173 |

FOREIGN PATENT DOCUMENTS

| JP | 2002-331616 A | 11/2002 | |
| JP | 2004-005540 A | 1/2004 | |
| JP | 2009-245935 A | 10/2009 | |
| JP | 2012-008255 A | 1/2012 | |
| WO | WO2008/066157 A1 | 6/2008 | |
| WO | WO2011/077910 | * 6/2011 | ............. G02B 1/105 |

* cited by examiner

*Primary Examiner* — Olga Merkoulova
(74) *Attorney, Agent, or Firm* — Lucas & Mercanti, LLP

(57) ABSTRACT

A touch panel (20) is attached, via a reflection-prevention layer (31) or an adhesive layer, to the polarizing plate (2) side of a display device (10) having the polarizing plate (2) laminated upon a display panel (1). The polarizing plate (2) has: a polarizer (3); and a film (4) having a film thickness of no more than 35 μm and laminated on the touch panel (20) side of the polarizer (3). The contact angle for the surface of the touch panel (20) side in the film is less than 60°.

9 Claims, 1 Drawing Sheet

DISPLAY DEVICE WITH TOUCH PANEL

CROSS REFERENCE TO RELATED APPLICATION

This Application is a 371 of PCT/JP2013/073143 filed on Aug. 29, 2013 which, in turn, claimed the priority of Japanese Patent Application No. JP2012-195832 filed on Sep. 6, 2012 both applications are incorporated herein by reference.

TECHNICAL FIELD

The present invention relates to a display device with a touch panel in which the touch panel is fitted on a display panel through a polarization plate.

BACKGROUND ART

As in recent years, various types of electronic devices such as a mobile telephone, a portable terminal device and a personal computer have become multifunctional and diversified, touch panels are used as one of the input units for those electronic devices. The touch panel is optically transparent, and is fitted through an anti-reflection layer or an adhesive agent to the side of a polarization plate in a display device where the polarization plate is stacked in layers on a display panel. As the touch panel described above, various types such as a capacitive touch panel are proposed.

As a typical capacitive touch panel, there is a capacitive touch panel in which on a transparent substrate, an X electrode pattern (transparent conductive film) extending in an X direction is formed, and on this pattern, through an insulating film, a Y electrode pattern (transparent conductive film) extending in a Y direction is formed. When the surface of the substrate in the touch panel is pressed by a finger, since the X electrode pattern and the Y electrode pattern are brought into contact to vary the capacitance in its position, the variation in capacitance is detected through the X electrode pattern and the Y electrode pattern, with the result that it is possible to identify the pressed position. This type of capacitive touch panel is disclosed in, for example, patent document 1.

RELATED ART DOCUMENT

Patent Document

Patent document 1: Japanese Unexamined Patent Application Publication No. 2012-8255 (see paragraphs [0106] to [0108], FIGS. 4 and 5 and the like)

DISCLOSURE OF THE INVENTION

Problems to be Solved by the Invention

In recent years, the thickness and the weight of the display device have been reduced, and not only the display panel but also the polarization plate stacked in layers on the display panel has been reduced in thickness. Since the thickness of the polarization plate is reduced as described above to increase the amount of light transmitted in the display device itself, it is possible to achieve energy conservation (to reduce power consumption) and to enhance display brightness.

However, on the other hand, the thickness of the display device is reduced, and thus the impact resistance to the pressing of the touch panel is easily degraded. Specifically, a load when the touch panel is pressed is easily placed on the junction portion between the touch panel and the display device (in particular, the polarization plate), and thus it is impossible to satisfactorily maintain the adhesion of an anti-reflection layer or an adhesive agent layer in the junction portion described above. Consequently, the anti-reflection layer or the adhesive agent is separated from the display device. Since the separation of the anti-reflection layer or the adhesive agent described above is more remarkably found as display unevenness by increasing the amount of light transmitted in the display device, the visibility of the display device is lowered.

A configuration in which the thickness of the polarization plate is increased to enhance the impact resistance is not appropriate because this prevents the reduction in the thickness of the display device and the reduction in the weight thereof and this also increases, when an endurance test is performed by heating, the warpage of the polarization plate to easily perform the separation of the anti-reflection layer or the adhesive agent.

In view of the foregoing conditions, an object of the present invention is to provide a display device with a touch panel in which the thickness of a polarization plate is decreased to reduce the separation of an anti-reflection layer or an adhesive agent, and thus it is possible to avoid a decrease in the visibility of the display device.

Means for Solving the Problem

The above object of the present invention is achieved by the following configuration.

1. A display device with a touch panel in which a touch panel is fitted through an anti-reflection layer or an adhesive agent layer to a display device, on a side of a polarization plate, where the polarization plate is stacked in layers on a display panel, where the polarization plate includes a polarizer and a film which is stacked in layers on the polarizer on a side of the touch panel and whose film thickness is equal to or less than 35 μm, and a contact angle on a surface of the film on the side of the touch panel is less than 60°.

2. The display device with a touch panel according to the item 1, where the film thickness of the film is equal to or less than 33 μm, and the contact angle on the film is equal to or less than 55°.

3. The display device with a touch panel according to the item 1 or 2, where the film thickness of the film is equal to or less than 28 μm, and the contact angle on the film is equal to or less than 55°.

4. The display device with a touch panel according to any one of the items 1 to 3, where a front layer of the film on the side of the touch panel is an acrylic resin layer, and the acrylic resin layer is formed with a coating composition which includes a multifunctional acrylic, a urethane prepolymer and a reactive silica particle.

5. The display device with a touch panel according to any one of the items 1 to 4, where the film includes cellulose.

6. The display device with a touch panel according to any one of the items 1 to 5, where the film include: an ester compound having a structure obtained by reaction of phthalic acid, adipic acid and at least one type of benzene monocarboxylic acid with at least one type of alkylene glycol having 2 to 12 carbon atoms; and a cellulose triacetate having an acetyl group substitution degree of 2.80 to 2.95 and a number average molecular weight equal to or more than 125000 but less than 155000.

7. The display device with a touch panel according to any one of the items 1 to 6, where the film is a hard coat film in which a hard coat layer is stacked in layers on a film base member.

Advantages of the Invention

In the configuration described above, the thickness of the polarization plate is decreased to reduce the separation of the anti-reflection layer and the adhesive agent, and thus it is possible to avoid a decrease in the visibility of the display device.

BEST MODE FOR CARRYING OUT THE INVENTION

Display Device with a Touch Panel

Figure 1:
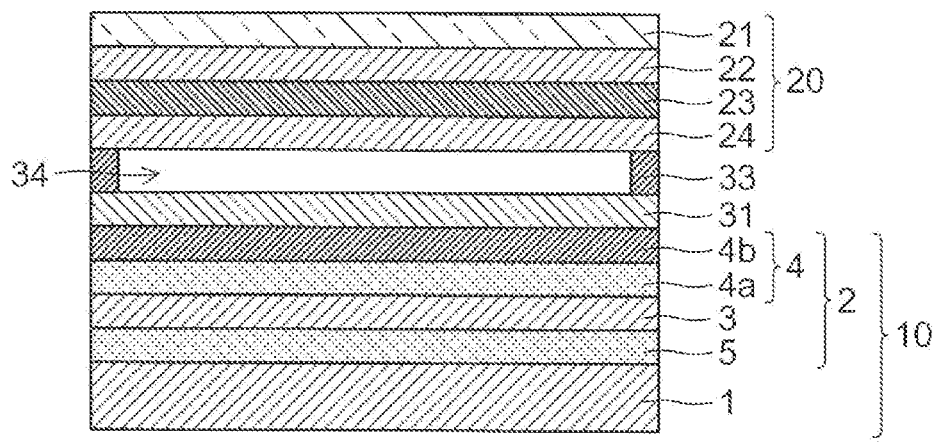
FIG. 1 A cross-sectional view showing a schematic configuration of a display device with a touch panel according to an embodiment of the present invention.
Figure 2:
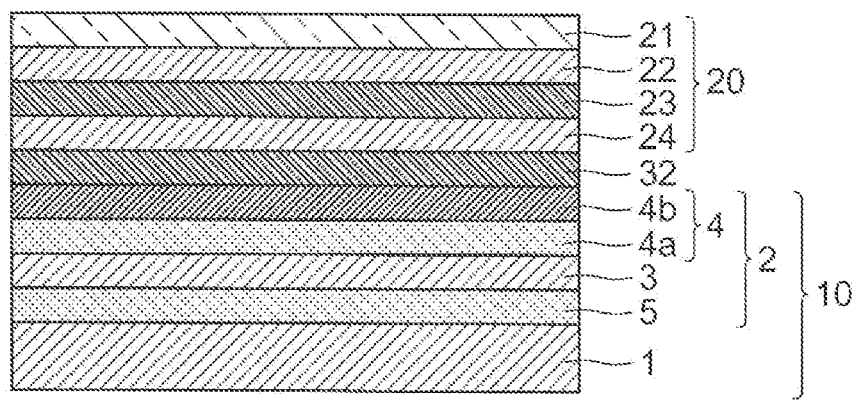
FIG. 2 A cross-sectional view showing another configuration of the display device with the touch panel.

FIG. 1 is a cross-sectional view showing a schematic configuration of a display device with a touch panel according to the present embodiment, and FIG. 2 is a cross-sectional view showing another configuration of the display device with the touch panel. As shown in these views, in the display device with the touch panel, on the side of a polarization plate 2 in the display device 10 where the polarization plate 2 is stacked in layers on a display panel 1, the touch panel 20 is fitted through an anti-reflection layer 31 or an adhesive agent layer 32.

The display panel 1 of the display device 10 can be formed with a liquid crystal display panel or an organic EL television set (OLED (organic light-emitting diode)—TV). As the liquid crystal display panel, the liquid crystal display panels of various drive methods such as an IPS (in plane switching) method and a TN (twisted nematic) method can be used.

The polarization plate 2 is formed with a polarizer 3 that transmits predetermined linearly polarized light, a film 4 that is sequentially stacked in layers on the polarizer 3 on the side of the touch panel 20 and a film 5 that is stacked in layers on the polarizer 3 on the side of the display device 10. The film 4 is formed with a hard coat film in which a hard coat layer 4b is stacked in layers on a film base member 4a. The film 4 may be formed with the film base member 4a alone (without the hard coat layer 4b being stacked in layers). The hard coat layer 4b is provided for protecting the surface of the polarization plate 2.

A contact angle on the surface (the surface of the hard coat layer 4b) of the film 4 on the side of the touch panel 20 is set less than 60°. Such a contact angle can be realized by appropriately selecting the constituent materials of the film 4 (in particular, the hard coat layer 4b). The thickness of the film 4 (the total of the thicknesses of the film base member 4a and the hard coat layer 4b) is equal to or less than 35 μm. The preferable range of the contact angle is equal to or less than 55°, and the preferable range of the thickness of the film 4 is equal to or less than 33 μm and the more preferable range is equal to or less than 28 μm.

When the display panel 1 is formed with an OLED, the polarization plate 2 is formed with a circularly polarizing plate for preventing the reflection of external light. Such a circularly polarizing plate is formed by adhering the polarizer 3 and the film 4 such that the optical axis of the polarizer 3 intersects the slow axis of the film 4 (the film base member 4a) at angle of 45°.

The touch panel 20 is a capacitive touch panel, and is formed by stacking in layers, on a glass substrate 21, a first electrode pattern 22 formed with a transparent conductive film, an interlayer insulating layer 23 and a second electrode pattern 24 formed with a transparent conductive film in this order. The surface of the glass substrate 21 is the touch surface of the touch panel 20. An insulting film may be provided so as to further cover the second electrode pattern 24.

The first electrode pattern 22 is formed so as to extend on the glass substrate 21 in one direction (for example, an X direction). The interlayer insulating layer 23 is formed on the glass substrate 21 so as to cover the first electrode pattern 22. The second electrode pattern 24 is formed so as to extend in a direction (for example, a Y direction) intersecting the direction in which the first electrode pattern 22 extends. When the surface of the touch panel 20 is pressed by a finger, the first electrode pattern 22 and the second electrode pattern 24 touch each other, and the capacitance between the first electrode pattern 22 and the second electrode pattern 24 is varied. The variation in capacitance is detected through the first electrode pattern 22 and the second electrode pattern 24, and thus it is possible to identify the pressed position (coordinates).

The anti-reflection layer 31 is a layer for preventing reflection off the surface, and is formed with, for example, a low refractive index layer. When the touch panel 20 is adhered to the edge portion of the display device 10 with an optical adhesive tape 33, in the parts other than the part of the adhesion, the touch panel 20 is opposite the anti-reflection layer 31 through an air gap layer 34.

The adhesive agent layer 32 is formed with an adhesion layer such as an OCA (optical clear adhesive tape) or a UV curing resin (OCR). The adhesive agent layer 32 is formed over the entire surface of the polarization plate 2 in the display device 10, and joins the touch panel 20 and the display device 10.

In a configuration in which the touch panel 20 is not fitted to the surface of the display device 10 (the polarization plate 2), the contact angle on the surface of the polarization plate 2 is often set equal to or more than 60° so that water or the like is prevented, as much as possible, from being adhered to the surface of the polarization plate 2.

However, in the present embodiment, as described above, in the polarization plate 2, the contact angle on the surface of the film 4 on the side of the touch panel 20 is set less than 60°. The contact angle on the surface of the film 4 is kept lowered as described above, and thus the anti-reflection layer 31 and the adhesive agent layer 32 are easily attached to the film 4, with the result that it is possible to enhance the adhesion thereof. In this way, it is possible to reduce the separation of the anti-reflection layer 31 or the adhesive agent layer 32. Moreover, since the film 4 is such a thin film such that the film thickness is equal to or less than 35 μm, it is possible to reduce the warpage of the film 4 after an endurance test by heating, and it is also possible to reduce the separation of the anti-reflection layer 31 or the adhesive agent layer 32 caused by the warpage of the film 4.

Hence, even when the thickness of the display device 10 is reduced to increase the amount of light transmitted, it is possible to reduce display unevenness caused by the separation described above, and it is possible to avoid a decrease in the visibility of the display device 10. Since the film 4 is such a thin film that the film thickness is equal to or less than 35 µm, the thickness of the polarization plate 2 can be sufficiently reduced, and thus it is possible to sufficiently contribute to the reduction in the thickness of the display device 10 and the reduction in the weight thereof.

In the configuration of the present embodiment, the thickness of the polarization plate 2 is reduced, and thus it is possible to reduce the separation of the anti-reflection layer 31 or the adhesive agent layer 32 and to avoid a decrease in the visibility of the display device 10. These effects can be reliably obtained when the contact angle on the film 4 is equal to or less than 55°, and the thickness of the film 4 is equal to or less than 33 µm (more preferably, is equal to or less than 28 µm).

Here, the surface layer of the film 4 on the side of the touch panel 20, that is, the hard coat layer 4b is formed with an acrylic resin layer, and the acrylic resin layer is preferably formed with a coating composition that includes a multifunctional acrylic, a urethane prepolymer and a reactive silica particle.

The surface layer of the film 4 is formed as described above, and thus it is possible to reliably realize the film 4 in which the contact angle on its surface is less than 60° (more preferably is equal to or less than 55°).

The film 4 (the film base member 4a) may include cellulose. More specifically, the film 4 may include: an ester compound having a structure obtained by reaction of phthalic acid, adipic acid and at least one type of benzene monocarboxylic acid with at least one type of alkylene glycol having 2 to 12 carbon atoms; and a cellulose triacetate having an acetyl group substitution degree of 2.80 to 2.95 and a number average molecular weight equal to or more than 125000 but less than 155000.

In the configuration using the film 4 (the film base member 4a) described above, the effects of the present embodiment described above can be obtained.

[About the Polarization Plate]

The individual layers of the polarization plate 2 described above will be described in detail below.

[Film Base Member]

As the film base member 4a and the film 5 of the polarization plate 2 (hereinafter collectively referred to simply as a film base member), a thermoplastic resin or a thermosetting resin can be used.

(Thermoplastic Resin)

The thermoplastic resin refers to a resin that is softened by being heated to its glass transition temperature or melting point and can be molded into an intended form.

As the thermoplastic resin that is a common generalpurpose resin, the followings can be used: cellulose ester, polyethylene (PE), high density polyethylene, medium density polyethylene, low density polyethylene, polypropylene (PP), polyvinyl chloride (PVC), polyvinylidene chloride, polystyrene (PS), polyvinyl acetate (PVAc), Teflon (registered trademark) (polytetrafluoroethylene, PTFE), ABS resin (acrylonitrile butadiene styrene resin), AS resin, acrylic resin (PMMA) and the like.

In particular, when strength and rigidity are required, the followings can be used: polyamide (PA), nylon, polyacetal (POM), polycarbonate (PC), modified polyphenylene ether (m-PPE, modified PPE, PPO), polybutylene terephthalate (PBT), polyethylene terephthalate (PET), glass fiber reinforced polyethylene terephthalate (GF-PET), cycloolefin polymer (COP) and the like.

Furthermore, when a high heat distortion temperature and a long-term use property are required, the followings can be used: polyphenylene sulfide (PPS), polytetrafluoroethylene (PTFE), polysulfone, polyethersulfone, amorphous polyarylate, liquid crystal polymer, polyether ether ketone, thermoplastic polyimide (PI), polyamide-imide (PAI) and the like.

In the present embodiment, in terms of achieving the effects of the present embodiment, the thermoplastic resin is preferably selected from the group consisting of cellulose ester resin, polycarbonate resin, acrylic resin and polyolefin resin.

The thickness of the resin film base member is preferably equal to or more than 20 µm, and is more preferably equal to or more than 30 µm; the sum of the thickness of the resin film base member and the thickness of the hard coat layer is preferably equal to or less than 35 µm in terms of the reduction in the thickness.

Particularly preferred resins in the present embodiment will be described in detail below.

<Cellulose Ester Resin>

The cellulose ester resin that can be used in the present embodiment is preferably at least one type selected from the group consisting of: lower fatty acid esters of cellulose such as cellulose (di, tri) acetate, cellulose propionate and cellulose butyrate; mixed fatty acid esters of cellulose such as cellulose acetate propionate, cellulose acetate butyrate and cellulose acetate phthalate; cellulose phthalate; and the like.

Among them, particularly preferable cellulose esters are cellulose triacetate, cellulose propionate, cellulose butyrate, cellulose acetate propionate and cellulose acetate butyrate.

A mixed fatty acid ester such as cellulose acetate propionate or cellulose acetate butyrate is preferably a cellulose resin that includes a cellulose ester which has, as a substituent group, an acyl group having 2 to 4 carbon atoms and which satisfies formulas (I) and (II) below simultaneously when it is assumed that the degree of substitution of an acetyl group is X and the degree of substitution of a propionyl group or a butyryl group is Y.

$$2.6 \leq X+Y \leq 3.0 \quad \text{Formula (I)}$$

$$1.0 \leq X \leq 2.5 \quad \text{Formula (II)}$$

Among them, in particular, cellulose acetate propionate is preferably used; among them, it is preferable that $1.9 \leq X \leq 2.5$ and $0.1 \leq Y \leq 0.9$. The part of the acyl group described above that is not substituted is generally present as a hydroxyl group. These can be synthesized by known methods.

Furthermore, as the cellulose ester used in the present embodiment, a cellulose ester in which a ratio of weight average molecular weight Mw/number average molecular weight Mn is 1.5 to 5.5 is preferably used, the ratio is particularly preferably 2.0 to 5.0, the ratio is further particularly preferably 2.5 to 5.0 and the cellulose ester in which the ratio is further preferably 3.0 to 5.0 is preferably used.

Preferably, as the lower fatty acid ester of cellulose, a cellulose triacetate A having an acetyl group substitution degree of 2.80 to 2.95 and a number average molecular weight (Mn) equal to or more than 125000 but less than 155000 is contained. As the cellulose triacetate A, a cellulose triacetate A in which its weight average molecular weight (Mw) is equal to or more than 265000 but less than 310000 and Mw/Mn is 1.9 to 2.1 is preferable.

In terms of enhancing its pencil hardness, a cellulose triacetate B in which its acetyl group substitution degree is 2.75 to 2.90, its number average molecular weight (Mn) is equal to or more than 155000 but less than 180000, Mw is equal to or more than 290000 but less than 360000 and Mw/Mn is 1.8 to 2.0 is preferably used together with the cellulose triacetate A. When the cellulose triacetate A and the cellulose triacetate B are used together, the mass ratio preferably falls within a range of the cellulose triacetate A: the cellulose triacetate B=100:0 to 20:80.

<Ester Compound>

A cellulose ester film preferably contains an ester compound in terms of excellent moisture impermeability. As the ester compound, an ester compound having a structure obtained by reaction of phthalic acid, adipic acid and at least one type of benzene monocarboxylic acid with at least one type of alkylene glycol having 2 to 12 carbon atoms is preferable.

As the ingredients of benzene monocarboxylic acid, for example, there are benzoic acid, para tertiary butyl benzoic acid, orusotoruiru acid, metatoruiru acid, p-toluic acid, dimethyl benzoic acid, ethyl benzoate, normal propyl benzoic acid, aminobenzoic acid and acetoxy benzoic acid; one type or a mixture of two or more types thereof can be used. Benzoic acid is most preferable.

As the ingredients of alkylene glycol having 2 to 12 carbon atoms, there are ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol-pentane), 2-n-butyl-2-ethyl-1,3-propanediol (3,3-dimethylol heptane), 3-methyl-1,5-pentanediol 1,6-hexanediol, 2,2,4-trimethyl-1,3-pentanediol, 2-ethyl-1,3-hexane diol, 2-methyl-1,8-octane diol, 1,9-nonan diol, 1,10-decane diol, 1,12-octadecane diol and the like. One type or a mixture of two or more types of these glycols is used. In particular, 1,2-propylene glycol is preferable.

The raw material cellulose of the cellulose ester used in the present embodiment may be either wood pulp or cotton linter. Although the wood pulp may be either conifer or broad-leaf tree, conifer is more preferable. In terms of separation at the time of film formation, cotton linter is preferably used. The cellulose esters made of these can be used as a mixture or alone as necessary.

For example, cellulose esters having the following ratios as a ratio of cellulose ester derived from cotton linter: cellulose ester derived from wood pulp (conifer):cellulose ester derived from wood pulp (broad-leaf tree) can be used; 100:0:0, 90:10:0, 85:15:0, 50:50:0, 20:80:0, 10:90:0, 0:100: 0, 0:0:100, 80:10:10, 85:0:15 and 40:30:30.

Preferably, in the cellulose ester resin of the present embodiment, pH when 1 g thereof is put into 20 ml of pure water (electric conductivity of 0.1 μS/cm or less, pH of 6.8) and is agitated in an atmosphere of nitrogen at 25° C. for one hour is 6 to 7, and electric conductivity is 1 to 100 μS/cm.

[Film Production Method]

A preferred method of forming the film base member in the present embodiment will then be described.

<Method of Manufacturing the Base Material by a Solution Cast Film Formation Method>

1) Dissolution Step

A dissolution step is a step of forming a dope by dissolving, in an organic solvent mainly containing a good solvent for a thermoplastic resin, a thermoplastic resin, a heat-shrinkable material and another additive in a dissolution kettle while agitating them. The good solvent refers to an organic solvent that has satisfactory solubility for a thermoplastic resin in a method of manufacturing an optical film by a solution cast film formation method; main effects are produced for dissolution, and a large amount of organic solvent used therein is referred to as a main (organic) solvent or a chief (organic) solvent.

In the dissolution of a thermoplastic resin, various dissolution methods can be used such as a method which is performed under normal pressure, a method which is performed at a temperature equal to or less than the boiling point of the main solvent, a method which is performed under pressure at a temperature equal to or more than the boiling point of the main solvent, a method which is performed by a cooling dissolution method disclosed in Japanese Unexamined Patent Application Publication No. 9-95544, Japanese Unexamined Patent Application Publication No. 9-95557 or Japanese Unexamined Patent Application Publication No. 9-95538 and a method which is performed under high pressure and which is disclosed in Japanese Unexamined Patent Application Publication No. 11-21379. The method which is performed under pressure at a temperature equal to or more than the boiling point of the main solvent is preferable.

A recycled material is also reused. The recycled material refers to an item produced by crushing a film into small pieces, and an item produced by cutting off the sides of the film formed at the time of film formation or an original film whose specifications are unsatisfactory due to a scratch or the like.

2) Cast Step

A cast step is a step of feeding a solution to a pressure die through a solution feed pump (for example, a pressurized metering gear pump) and casting the dope from a pressure die slit to a cast position on a meal support member such as an endless metal belt which performs transfer endlessly, for example, a stainless belt or a rotating metal drum.

A pressure die is preferable in which the slit shape of the base part of the die can be adjusted and in which the film thickness can be easily made uniform. Examples of the pressure die include a coat hanger die and a T-die, and either of them is preferably used. The surface of the metal support member is a mirror surface. In order to increase the speed of the film formation, two or more pressure dies may be provided on the metal support member such that the amount of dope is divided to stack layers. It is also preferable to obtain the film of a multilayer structure by a co-cast method of casting a plurality of dopes at the same time.

3) Solvent Evaporation Step

A solvent evaporation step is a step of heating a web (a doped film formed by casting the dope on a cast support member) on the cast support member to evaporate a solvent.

Although in order to evaporate the solvent, there are a method of blowing air from the side of the web and/or a method of transferring heat from the back surface of the support member with a liquid, a method of transferring heat from the front and back surfaces with radiation heat and the like, the back surface liquid heat transfer method is preferable because it has a satisfactory drying efficiency. A method of combing those is also preferably used. The web on the support member after the cast is preferably dried on the support member in an atmosphere of 40 to 100° C. Preferably, in order to maintain the atmosphere of 40 to 100° C., hot air of this temperature is blown to the upper surface of the web or heating is performed by way of infrared rays or the like.

In terms of surface quality, moisture permeability and separation, it is preferable to separate the web from the support member within 30 to 120 seconds.

4) Separation Step

A separation step is a step of separating, in a separation position, the web in which the solvent is evaporated on the metal support member. The separated web is fed to the subsequent step.

The temperature in the separation position on the metal support member is preferably 10 to 40° C., and is further preferably 11 to 30° C.

Preferably, a residual solvent amount at the time of the separation of the web on the metal support member when the separation is performed falls within a range of 50 to 120 mass % depending on the magnitude of the condition of drying, the length of the metal support member and the like, and the separation is performed within such a range. However, when the separation is performed at the point when a larger residual solvent amount is present, since the web is excessively soft to degrade flatness at the time of the separation and to easily produce a crease and a vertical streak by separation tension, the residual solvent amount at the time of the separation is determined with consideration given to both economical speed and quality.

The residual solvent amount of web is defined by formula below:

residual solvent amount (%)=(mass of web before heating processing−mass of web after heating processing)/(mass of web after heating processing)×100

The heating processing when the residual solvent amount is measured refers to heating processing at 115° C. for one hour.

The separation tension when the metal support member and the film are separated from each other is generally 196 to 245 N/m. When a crease is easily produced at the time of the separation, the separation is performed preferably with a tension of 190 N/m or less, further preferably with a tension from the lowest tension capable of the separation to 166.6 N/m and more preferably with a tension from the lowest tension to 137.2 N/m; in particular, the separation is performed preferably with a tension from the lowest tension to 100 N/m.

In the present embodiment, the temperature in the separation position on the metal support member is preferably set at a temperature of −50 to 40° C., is more preferably set at a temperature of 10 to 40° C. and is most preferably set at a temperature of 15 to 30° C.

5) Drying and Stretching Step

A drying and stretching step is a step of drying the web with a drying device that transports, after the separation, the web by cyclically passing through a plurality of rolls arranged within the drying device and/or a tenter stretching device that clips both ends of the web with a clip to transport it.

Although a drying unit which blows hot air to both surfaces of the web is commonly used, a unit which applies microwaves instead of air can be used. Significantly sudden drying is more likely to damage the flatness of the finished film. Drying at a high temperature is preferably performed when the residual solvent is about 8 mass % or less. The drying is performed at about 40 to 250° C. throughout the step. In particular, the drying is preferably performed at 40 to 160° C.

When the tenter stretching device is used, the device is preferably used that can independently control, on the left and right, the grasping length (the distance from the start of the grasping to the completion of the grasping) of the film with the left/right grasping unit of the tenter. Preferably, in the tenter step, in order to improve the flatness, partitions having intentionally different temperatures are also formed.

In order to prevent the partitions from interfering with each other, a neutral zone is preferably provided between the different-temperature partitions.

The stretching operation may be divided into multiple stages and performed, and biaxial stretching is preferably performed both in the direction of cast and in the widthwise direction. When the biaxial stretching is performed, the biaxial stretching may be performed simultaneously or may be performed stepwise.

In this case, the "stepwise" indicates, for example, that it is possible to sequentially perform the rounds of stretching in different directions of stretching or that it is possible to divide stretching in the same direction into multiple stages and add stretching in a different direction to any one of the stages. Specifically, for example, the following stretching steps can be performed.

a) stretching in the direction of cast—stretching in the widthwise direction—stretching in the direction of cast—stretching in the direction of cast b) stretching in the widthwise direction—stretching in the widthwise direction—stretching in the direction of cast—stretching in the direction of cast The simultaneous biaxial stretching includes a case where stretching is performed in one direction, and is performed in the other direction, while tension is alleviated to perform contraction. A stretching factor preferable for the simultaneous biaxial stretching can be set within a range of 1.01 to 1.5 both in the widthwise direction and in the longitudinal direction.

The residual solvent amount of web when stretching is performed is preferably 20 to 100 mass % at the start of the stretching and drying is preferably performed while the stretching is performed until the residual solvent amount of web reaches 10 mass % or less, and further preferably reaches 5 mass % or less.

The drying temperature when stretching is performed is preferably 30 to 160° C., is further preferably 50 to 150° C. and is most preferably 70 to 140° C.

In the stretching step, the temperature differences of the atmosphere in the widthwise direction are preferably small in terms of enhancing the uniformity of the film, and the temperature differences in the widthwise direction in the stretching step preferably fall within ±5° C., more preferably falls within ±2° C. and most preferably falls within ±1° C.

6) Winding Step

A winding step is a step of winding the film with a winding machine after the residual solvent amount of web reaches 2 mass % or less, and the residual solvent amount is set at 0.4 mass % or less and thus it is possible to obtain a film having satisfactory dimensional stability. In particular, it is preferable to wind it when the residual solvent amount is 0.00 to 0.10 mass %.

As the winding method, a commonly used method may be adopted, and there are a constant torque method, a constant tension method, a taper tension method, a constant internal stress program tension control method and the like, and any of them is preferably used depending on the situation.

The film base member according to the present embodiment is preferably a long film. Specifically, a film base member having a length of about 100 to 5000 m is indicated, and is generally provided in the form of a roll. The width of the film is preferably 1.3 to 4 m, and is more preferably 1.4 to 2 m.

<Method of Manufacturing the Base Member by a Melt Cast Film Formation Method>

A method of manufacturing the film base material according to the present embodiment by a melt cast film formation method will then be described.

<Step of Manufacturing Melting Pellets>

Preferably, in general, a composition that is used for melt extrusion and that includes a resin is previously kneaded into pellets.

The pellets may be formed by a known method; for example, an additive formed of a dried thermoplastic resin, a heat-shrinkable material and the like is fed by a feeder into an extruder, is kneaded with a one-axis or two-axis extruder, is extruded from a die into the form of a strand, is water-cooled or air-cooled and is cut, with the result that it is possible to form it into pellets.

It is important to dry the raw material before extrusion in terms of preventing the decomposition of the raw material. Since in particular, a cellulosic ester easily absorbs moisture, it is dried with a dehumidified hot air dryer or a vacuum dryer at a temperature of 70 to 140° C. for three hours or more with the result that its moisture percentage is preferably 200 ppm or less and is further preferably 100 ppm or less.

The additives may be mixed before being fed into the extruder or may be individually fed by the feeder. Preferably, a small amount of additives such as particles and an antioxidant may be previously mixed such that they are uniformly mixed.

With respect to the mixture of the antioxidant, solids may be mixed with each other, the antioxidant may be mixed, as necessary, after being dissolved in a solvent and impregnated into a thermoplastic resin or the antioxidant may be mixed by spraying.

In terms of performing drying and mixture simultaneously, a vacuum Nauta mixer or the like is preferably used. Preferably, when an exit from a feeder portion or the die and the like are in contact with air, they are placed in an atmosphere of dehumidified air, dehumidified $N_2$ gas or the like.

Preferably, in the extruder, its shear force is reduced, it is possible to form a resin into pellets such that the resin is not degraded (for example, a decrease in molecular weight, coloring or gel formation) and processing is performed at as low a temperature as possible. Preferably, for example, in the case of a two-axis extruder, a deep groove-type screw is used, and rotation in the same direction is performed. In terms of the uniformity of kneading, it is preferable to use a meshing type.

The pellets obtained as described above are used to form the film. The pellets are not formed, and the powder of the raw material itself can be fed with the feeder into the extruder and formed into the film.

<Step of Extruding a Molten Mixture from the Die to a Cooling Roll>

With a one-axis or two-axis extruder, at a melting temperature Tm of about 200 to 300° C. at the time of the extrusion, after foreign matters are removed by filtration with a leaf disc-type filter or the like, the produced pellets are co-extruded from a T dire into the form of a film, is solidified on a cooling roll and is cast while being pressed between the cooling roll and an elastic touch roll. Tm represents a temperature of the exit portion of the die in the extruder.

Preferably, at the time of introduction from a feed hopper into the extruder, under vacuum, under reduced pressure or in an atmosphere of an inert gas, oxidative decomposition or the like is prevented.

When a scratch is produced in the die or a foreign matter such as a condensate of a plasticizer is attached to the die, a streaky defect may be produced. Such a defect is also referred to as a die line; in order to reduce a defect such as a die line on the surface, it is preferable to adopt a structure in which in piping from the extruder to the die, the residence portion of the resin is minimized. It is preferable to use a die in which a scratch or the like within the die or in a lip is minimized, Preferably, on the inner surface of the extruder, the die and the like in contact with the molten resin, surface processing for reducing the attachment of the molten resin is performed, for example, by reducing its surface roughness or by using a material whose surface energy is low. Specifically, the inner surface that undergoes hard chrome plating or ceramic thermal spray is ground such that the surface roughness is 0.2 S or less.

Although there is no particular restriction on the cooling roll, a roll having such a structure that it is formed with a high-rigidity metal roll and a heating medium or a cooling medium capable of temperature control flows therewithin is preferably used. Although the size of the cooling roll is not limited, the cooling roll preferably has a size large enough to cool the film molten and extruded; in general, the diameter of the cooling roll is about 100 mm to 1 m.

Examples of the surface material of the cooling roll include carbon steel, stainless steel, aluminum and titanium. Furthermore, in order to increase the hardness of the surface or improve separation from the resin, surface processing such as hard chrome plating, nickel plating, amorphous chromium plating or ceramic thermal spray is preferably performed.

The surface roughness of the cooling roll is preferably 0.1 μm or less in Ra, and is further preferably 0.05 μm or less. As the surface of the roll is more smoothed, the surface of the obtained film can be more smoothed. It is needless to say that preferably, the surface on which the surface processing is performed is further ground so as to have the surface roughness described above.

As the elastic touch roll, it is possible to use a silicon rubber roll whose surface is coated with a thin film metal as disclosed in Japanese Unexamined Patent Application Publication No. 03-124425, Japanese Unexamined Patent Application Publication No. 08-224772, Japanese Unexamined Patent Application Publication No. 07-100960, Japanese Unexamined Patent Application Publication No. 10-272676, WO97/028950, Japanese Unexamined Patent Application Publication No. 11-235747, Japanese Unexamined Patent Application Publication No. 2002-36332, Japanese Unexamined Patent Application Publication No. 2005-172940 and Japanese Unexamined Patent Application Publication No. 2005-280217.

When the film is separated from the cooling roll, it is preferable to prevent deformation of the film by controlling tension.

[Method of Manufacturing a Composite Resin Film]

The film base member of the present embodiment can be formed with a composite resin film. As a method of manufacturing a composite resin film, there is a manufacturing method including a film formation step by a co-cast method and a manufacturing method including a film formation step by a co-extrusion method.

<Co-Cast Method: Double Case Method>

In a metal support member in a cast step, its surface is preferably mirror-finished; as the metal support member, a stainless steel belt or a drum whose surface has platted finish by casting is preferably used. The width of the cast can be set at 1 to 4 m.

The surface temperature of the metal support member in the cast step is set within a range from −50° C. to a temperature at which a solvent is prevented from being boiled to foam. Although it is preferable to increase the temperature because the drying speed can be increased, when the temperature is excessively increased, the web may be foamed or the flatness may be degraded. A preferred support member temperature is determined as necessary to fall within a range of 0 to 100° C., and a range of 5 to 30° C. is more preferable. To cool the web into gel and separate it from the drum in a state where a large amount of residual solvent is contained is also a preferred method.

Although a method of controlling the temperature of the metal support member is not particularly limited, there are a method of spraying hot air or cold air and a method of bringing hot water into contact with the back side of the metal support member. Since in the method using hot water, heat is transmitted more efficiently, and thus it takes less time to make the temperature of the metal support member constant, the method using hot water is preferable. As the method using hot air, there is a method of using hot air whose temperature is equal to or more than the boiling point of the solvent with consideration given to a decrease in the temperature of the web caused by the latent heat of vaporization of the solvent and of using air whose temperature is higher than the intended temperature while preventing foaming Preferably, in particular, from the cast until the separation, the temperature of the support member and the temperature of the dry air are changed, and drying is efficiently performed.

Preferably, in the present embodiment, the solution of acetylated cellulose is divided and thus cast is performed twice or more times.

A prepared dope A is cast by the die to the stainless steel belt, and on the cast web, a prepared dope B is further cast through the die so as to be stacked in layers. The web stacked in layers is separated at a separation point, and thereafter is dried in a dry zone and is wound.

The compositions of the dope A and the dope B are not particularly limited, and any composition ratio of an acetylated cellulose, a cellulose nanofiber, other additives and solvents can be adopted. The thickness of the cast film of the dope A and the dope B is not particularly limited. Division cast can also be performed three or more times.

In the present embodiment, the cast is divided as described above, and thus it is possible to easily control the state of the distribution of the cellulose nanofiber within the film, with the result that it is possible to control the tear strength of the film, an elastic modulus and the degree of film dimensional change according to the requirements thereof.

Preferably, a dry step can be used in which after the cellulose fiber is cast, the fiber is easily aligned within the film surface in the dry step.

<Co-Extrusion Method>

In the present embodiment, a multilayer film can be produced by a co-extrusion method. For example, it is possible to produce a film having a configuration of a skin layer/a core layer/a skin layer. For example, a large amount of matt agent is present in the skin layer or can be put into only the skin layer. Larger amounts of plasticizer and ultraviolet absorber can be put into the core layer than into the skin layer or the plasticizer and the ultraviolet absorber may be put into only the core layer. The types of plasticizer and ultraviolet absorber can also be changed for each of the core layer and the skin layer; for example, the plasticizer and/or the ultraviolet absorber having a low volatility can be contained in the skin layer, and the plasticizer having an excellent plasticity or the ultraviolet absorber having an excellent ultraviolet absorptivity can be added to the core layer. The glass transition temperatures of the skin layer and the core layer may be different, and the glass transition temperature of the core layer is preferably lower than that of the skin layer. Here, both the glass transition temperatures of the skin and the core are measured, the average value calculated from their volume fractions is defined as the glass transition temperature Tg described above and they can likewise be treated. The viscosity of the molten material containing the cellulose ester at the time of melt cast may be different between the skin layer and the core layer. Either the viscosity of the skin layer>the viscosity of the core layer or the viscosity of the core layer the viscosity of the skin layer holds true.

The co-extrusion method described above is a method of using a plurality of extruders, heating and melting resins stacked in layers therefrom, combining the resins, then co-extruding it through a slit-shaped discharge port of a T die, cooling and solidifying it with a child roll and forming a cast sheet (in a non-stretched state). As a method of combining the molten resins and extruding into the sheet through the T die, there are a feed block method of combining the molten resins and then widening a manifold and a multi-manifold method of individually widening the molten resins with manifolds and then combining them. Either of the methods may be used.

Preferably, when the core layer and the skin layer are cooled and solidified with the child roll, a pressure is applied, and thus the fiber is easily aligned within the film surface and a linear expansion coefficient within the film surface can be lowered.

[Additive]

(Antioxidant)

The film base member preferably includes an antioxidant as an additive. A preferred antioxidant is a phosphorus-based antioxidant or a phenolic-based antioxidant; more preferably a phosphorus-based antioxidant and a phenolic-based antioxidant are combined at the same time. Antioxidants that can be desirably used in the present embodiment will be described below.

<Phenolic-Based Antioxidant>

In the present embodiment, a phenolic-based antioxidant is preferably used, and in particular, a hindered phenol compound is preferably used.

Specific examples of the hindered phenol compound include n-octadecyl 3-(3,5-di-t-butyl-4-hydroxyphenyl)-propionate, n-octadecyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxyphenyl benzoate, n-dodecyl 3,5-di-t-butyl-4-hydroxyphenyl benzoate, neo-dodecyl 3-(3,5-di-t-butyl-4-hydroxyphenyl) propionate, dodecyl β (3,5-di-t-butyl-4-hydroxyphenyl) propionate, ethyl α-(4-hydroxy-3,5-di-t-butylphenyl) isobutyrate, octadecyl α-(4-hydroxy-3,5-di-t-butylphenyl) isobutyrate, octadecyl α-(4-hydroxy-3,5-di-t-butyl-4-hydroxyphenyl) propionate, 2-(n-octylthio) ethyl 3,5-di-t-butyl-4-hydroxy-benzoate, 2-(n-octylthio) ethyl 3,5-di-t-butyl-4-hydroxy-phenyl acetate, 2-(n-octadecyl thio) ethyl 3,5-di-t-butyl-4-hydroxy-phenyl acetate, 2-(n-octadecyl thio) ethyl 3,5-di-t-butyl-4-hydroxybenzoate, 2-(2-hydroxyethylthio) ethyl 3,5-di-t-butyl-4-hydroxybenzoate, diethyl glycol bis-(3,5-di-t-butyl-4-hydroxy-phenyl) propionate, 2-(n-octadecyl thio) ethyl 3-(3,5-di-t-butyl-4-hydroxyphenyl) propionate, stearamide-N,N-bis-[ethylene 3-(3,5-di-t-butyl-4-hydroxyphenyl) propionate], n-butylimino-N,N-bis-[ethylene 3-(3,5-di-t-butyl-4-hydroxyphenyl) propionate], 2-(2-stearoyloxy ethyl thio) ethyl 3,5-di-t-butyl-4-hydroxybenzoate, 2-(2-stearoyloxy ethyl thio) ethyl 7-(3-methyl-5-t-butyl-4-hydroxyphenyl) heptanoate, 1,2-propylene glycol bis-[3-(3,5-di-t-butyl-4-hydroxyphenyl) propionate], ethylene glycol bis-[3-(3,5-di-t-butyl-4-hydroxyphenyl) propionate], neopentyl glycol bis-[3-(3,5-di-t-butyl-4-hydroxyphenyl) propionate], ethylene glycol bis-(3,5-di-t-butyl-4-hydroxyphenyl acetate), glycerol-1-n-octadecanoate-2,3-bis-(3,5-di-t-butyl-4-hydroxyphenyl acetate), pentaerythritol-tetrakis-[3-(3',5'-di-t-butyl-4'-hydroxyphenyl) propionate], 1,1,1-trimethylol ethane-tris[3-(3,5-di-t-butyl-4-hydroxyphenyl) propionate], sorbitol hexa-[3-(3,5-di-t-butyl 4-hydroxyphenyl) propionate], 2-hydroxyethyl 7-(3-methyl-5-t-butyl-4-hydroxyphenyl) propionate, 2-stearoyl-oxy-ethyl 7-(3-methyl-5-t-butyl-4-hydroxyphenyl) heptanoate, 1,6-n-hexanediol-bis [(3',5'-di-t-butyl-4-hydroxyphenyl) propionate] and pentaerythritol-tetrakis(3,5-di-t-butyl-4-hydroxyhydrocinnamate). For example, the hindered phenol compound of the type described above is commercially available as product names "Irganox 1076" and "Irganox 1010" by Ciba Japan Company Ltd.

<Phosphorus-Based Antioxidant>

As the phosphorus-based antioxidant, a phosphorus-based compound such as a phosphite, a phosphonite, a phosphinite or a tertiary phosphane can be used. As the phosphorus-based compound, a conventionally known compound can be used. For example, phosphorus-based compounds are preferable that are disclosed in Japanese Unexamined Patent Application Publication No. 2002-138188, paragraphs [0022]-[0027] of Japanese Unexamined Patent Application Publication No. 2005-344044, paragraphs [0023]-[0039] of Japanese Unexamined Patent Application Publication No. 2004-182979, Japanese Unexamined Patent Application Publication No. 10-306175, Japanese Unexamined Patent Application Publication No. 1-254744, Japanese Unexamined Patent Application Publication No. 2-270892, Japanese Unexamined Patent Application Publication No. 5-202078, Japanese Unexamined Patent Application Publication No. 5-178870, Japanese Unexamined Patent Application Publication (Translation of PCT Application) No. 2004-504435, Japanese Unexamined Patent Application Publication (Translation of PCT Application) No. 2004-530759 and Japanese Unexamined Patent Application Publication No. 2005-353229.

The amount of phosphorus-based compound added is generally 0.01 to 10 parts by mass with respect to 100 parts by mass of the resin, is preferably 0.05 to 5 parts by mass and is further preferably 0.1 to 3 parts by mass.

In addition to the compounds represented by the above general formulas, as the phosphorus-based compound, there are: for example, mono phosphite compounds such as triphenyl phosphite, diphenyl isodecyl phosphite, phenyl diisodecyl phosphite, tris (nonyl phenyl)phosphite, tris (dinonylphenyl)phosphite, tris (2,4-di-t-butyl-phenyl)phosphite, 10-(3,5-di-t-butyl-4-hydroxybenzyl)-9,10-dihydro-9-oxa-10-phospha-phenanthrene-10-oxide, 6-[3-(3-t-butyl-4-hydroxy-5-methylphenyl) propoxy]-2,4,8,10-tetra-t-butyldibenz[d,f][1.3.2]dioxaphosphepin and tridecyl phosphite; diphosphite-based compounds such as 4,4'-butylidene-bis(3-methyl-6-t-butylphenyl-di-tridecyl phosphite) and 4,4'-isopropylidene-bis(phenyl-di-alkyl (C12 to C15) phosphite); phosphonite compounds such as triphenyl phosphonite, tetrakis (2,4-di-tert-butylphenyl) [1,1-biphenyl]-4,4'-diyl bis phosphonite, tetrakis (2,4-di-tert-butyl-5-methyl phenyl) [1,1-biphenyl]-4,4'-diylbisphosphonite; phosphinite-based compounds such as triphenylphosphinite and 2,6-dimethyl-phenyl diphenylphosphinite; and phosphine compounds such as triphenyl phosphine and tris (2,6-dimethoxyphenyl)phosphine.

The phosphorus-based compound of the above type is commercially available, for example, as product names "Sumilizer GP" by Sumitomo Chemical Company, Ltd., "ADK STAB PEP-24G", "ADK STAB PEP-36" and "ADK STAB 3010" by ADEKA Corporation, "IRGAFOS P-EPQ" by Ciba Japan Company Ltd. and "GSY-P101" by Sakai Chemical Industry Co., Ltd.

(Other Antioxidants)

Other examples of antioxidants include: sulfur-based antioxidants such as dilauryl-3,3'-thiodipropionate, dimyristyl-3,3'-thiodipropionate, distearyl-3,3'-thiodipropionate and pentaerythrityltetrakis (3-laurylthiopropionate); heat processing stabilizers such as 2-tert-butyl-6-(3-tert-butyl-2 hydroxy-5-methylbenzyl)-4-methylphenylacrylate, 2-[1-(2-hydroxy-3,5-di-tert-pentylpheyl)ethyl]-4,6-di-tert-pentyl-phenylacrylate; a 3,4-dihydro-2H-1-benzopyrane type compound; a 3,3'-spirodicumarone type compound, a 1,1-spiroindane type compound, and a compound provided with a morpholine, thiomorpholine oxide, thiomorpholine dioxide or piperazine skeleton as a partial structure which are described in Examined Japanese Patent Application Publication No. 8-27508; and an oxygen scavenger such as a dialkoxybenzene type compound described in Japanese Unexamined Patent Application Publication No. 3-174150. Partial structures of these antioxidants may be pendent to part of a polymer or regularly pendent to a polymer or may be introduced into part of the molecular structure of an additive such as a plasticizer, an acid scavenger or an ultraviolet absorber.

(Other Additives)

The film base member according to the present embodiment can contain, as additives, not only the above compounds and the like but also various compounds and the like according to the purpose.

<Acid Scavenger>

With respect to an acid scavenger, an epoxy compound as an acid scavenger described in U.S. Pat. No. 4,137,201 is preferably incorporated. Such an epoxy compound as an acid scavenger is well known in the art and includes diglycidyl ether of various polyglycols, particularly, polyglycol which is derived by condensation of approximately 8-40 mol of ethyleneoxide per 1 mol of polyglycol and diglycidyl ether of glycelol; a metal epoxy compound (for example, those conventionally utilized in and utilized together with, a vinyl chloride polymer composition); an epoxidated ether condensate, diglycidyl ether of bisphenol A (that is 4,4'-dihydroxydiphenylmethyl methane), epoxidated unsaturated fatty acid ester (particularly, ester of alkyl having a carbon number of 4-2 and fatty acid having a carbon number of 2-22 (such as butylepoxy stearate)); and various epoxidated long chain fatty acid triglycerides (for example, epoxidated vegetable oil and other unsaturated natural oil represented and exemplified by a composition of such as epoxidated soy bean oil (these sometimes referred to as epoxidated natural glyceride or unsaturated fatty acid, and these fatty acids generally have a carbon number of 12-22)).

<Light Stabilizer>

As a light stabilizer, there are hindered amine light stabilizer (HALS) compounds, and these are known compounds; examples thereof include 2,2,6,6-tetraalkyl piperidine compounds, their acid addition salts and complexes of metal compounds therewith as disclosed in the fifth to eleventh columns of the specification of U.S. Pat. No. 4,619,956 and the third to fifth columns of the specification of U.S. Pat. No. 4,839,405. Furthermore, a light stabilizer disclosed in Japanese Unexamined Patent Application Publication No. 2007-63311 can be used.

<Ultraviolet Absorber>

As the ultraviolet absorber, an ultraviolet absorber is preferable that has an excellent absorption capacity of ultraviolet light having wavelengths of 370 nm and less in terms of the prevention of degradation by ultraviolet light and that little absorbs visible light having wavelengths of 400 nm and more in terms of liquid crystal display. Examples thereof include an oxybenzophenone-based compound, a benzotriazole-based compound, a salicylate-based compound, a benzophenone-based compound, a cyanoacrylate-based compound and a nickel complex salt-based compound; a benzophenone-based compound and a benzotriazole-based compound having little coloring are preferable. Ultraviolet absorbers disclosed in Japanese Unexamined Patent Application Publication No. 10-182621 and Japanese Unexamined Patent Application Publication No. 8-337574 and a polymer ultraviolet absorber disclosed in Japanese Unexamined Patent Application Publication No. 6-148430 may be used.

Specific examples of the benzotriazole-based compound include 2-(2'-hydroxy-5'-methylphenyl)benzotriazole, 2-(2'-hydroxy-3',5'-di-tert-butyl phenyl)benzotriazole, 2-(2'-hydroxy-3'-tert-butyl-5'-methylphenyl)benzotriazole, 2-(2'-hydroxy-3',5'-di-tert-butyl-phenyl)-5-chloro-benzotriazole, 2-(2'-hydroxy-3'-(3'',4'',5'',6''-tetrahydrophthalimide-methyl)-5'-methylphenyl)benzotriazole, 2,2-methylenebis(4-(1,1,3,3-tetramethyl butyl)-6-(2H-benzotriazol-2-yl) phenol), 2-(2'-hydroxy-3'-tert-butyl-5'-methylphenyl)-5-chloro-benzotriazole, 2-(2'-hydroxy-3'-tert-butyl-5'-(2-octyloxy-carbonyl-ethyl)-phenyl)-5-chloro-benzotriazole, 2-(2'-hydroxy-3'-(1-methyl-1-phenylethyl)-5'-(1,1,3,3-tetramethyl butyl)-phenyl)benzotriazole, 2-(2H-benzotriazol-2-yl)-6-(linear and side chain dodecyl)-4-methylphenol, and a mixture of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate. However, there is no restriction on these.

Examples of commercially available products include TINUVIN 326, TINUVIN 109, TINUVIN 171, TINUVIN 900, TINUVIN 928 and TINUVIN 360 (all of which are made by Ciba Japan Company Ltd.), LA31 (made by ADEKA Corporation), Sumisorb 250 (made by Sumitomo Chemical Company, Ltd.) and RUVA-100 (made by Otsuka Chemical Co., Ltd.).

Specific examples of the benzophenone-based compound include: 2,4-dihydroxy benzophenone, 2,2'-dihydroxy-4-methoxy benzophenone, 2-hydroxy-4-methoxy-5-sulfo benzophenone and bis(2-methoxy-4-hydroxy-5-benzoyl phenyl methane). However, there is no restriction on these.

In the present embodiment, 0.1 to 20% by mass of ultraviolet absorber is preferably added, 0.5 to 10% by mass of ultraviolet absorber is further preferably added and 1 to 5% by mass of ultraviolet absorber is further preferably added. Two or more types thereof may be used together.

<Matt Agent>

Minute particles such as a matt agent can be added to the film base member of the present embodiment; as the minute particles, there are particles of an inorganic compound and particles of an organic compound. Examples of the minute particles include inorganic minute particles of silicon dioxide, titanium dioxide, aluminum oxide, zirconium oxide, calcium carbonate, kaolin, talc, burned calcium silicate, hydrated calcium silicate, aluminum silicate, magnesium silicate and calcium phosphate and crosslinked polymer particles. Among them, silicon dioxide is preferable because the haze of the resin substrate can be reduced. Minute particles of silicon dioxide or the like are often subjected to surface processing with an organic substance; these minute particles are preferable because the haze of the resin substrate can be reduced.

Examples of the preferred organic substance for the surface processing include halosilanes, alkoxysilanes, silazane and siloxane. As the average particle diameter of the minute particles is increased, the slip effect is increased whereas as the average particle diameter is reduced, the transparency becomes more excellent.

The average particle diameter of the secondary particles of the minute particles falls within a range of 0.05 to 1.0 μm. The average particle diameter of the secondary particles of the minute particles preferably falls within a range of 5 to 50 nm, and further preferably falls within a range of 7 to 14 nm. These minute particles are preferably used because in the surface of the cellulose ester film, projections and recesses of 0.01 to 1.0 μm are produced in the surface of the cellulose ester film. The content of the minute particles in the cellulose ester film is preferably 0.005 to 0.3% by mass with respect to the cellulose ester.

Examples of the minute particles of silicon dioxide include AEROSILs 200, 200V, 300, R972, R972V, R974, 8202, R812, OX50 and TT600 made by Nippon Aerosil Co., Ltd.; AEROSILs 200V, R972, R972V, R974, R202 and R812 are preferable. Two or more types of these minute particles may be used together. When two or more types are used together, they can be mixed in an arbitrary ratio and be used. In this case, minute particles having different average particle diameters and materials, for example, AEROSILs 200V and R972V can be used in a mass ratio range of 0.1:99.9 to 99.9:0.1.

The presence of the minute particles in the base material used as the matt agent described above can also be used as another purpose for enhancing the strength of the base material.

[Hard Coat Layer]

The details of the hard coat layer in the polarization plate will then be described. In the present embodiment, the hard coat layer is preferably formed with, for example, an active energy ray curable resin.

(Active Energy Ray Curable Resin)

The active energy ray curable resin is a resin that is cured after a cross-linking reaction or the like by the application of active rays such as ultraviolet rays or electron rays; specifically, the active energy ray curable resin is a resin that has an ethylenically unsaturated group. More specifically, an ultraviolet-curable urethane acrylate-based resin, an ultraviolet-curable polyester acrylate-based resin, an ultraviolet-curable epoxy acrylate-based resin, an ultraviolet-curable polyol acrylate-based resin and an ultraviolet curable epoxy resin are preferably used. Among them, the ultraviolet-curable acrylate-based resin is preferable.

As the ultraviolet-curable acrylate-based resin, a multifunctional acrylate is preferable. The multifunctional acrylate is preferably selected from the group consisting of a pentaerythritol multifunctional acrylate, a dipentaerythritol multifunctional acrylate, a pentaerythritol multifunctional methacrylate and a dipentaerythritol multifunctional methacrylate. Here, the multifunctional acrylate is a compound that includes two or more acryloyl oxy groups or methacryloyl oxy groups in the molecule.

Examples of the monomer of the multifunctional acrylate preferably include ethylene glycol diacrylate, diethylene glycol diacrylate, 1,6-hexanediol diacrylate, neopentyl glycol diacrylate, trimethylol propane triacrylate, trimethylol ethane triacrylate, tetramethylolmethane triacrylate, tetramethylolmethane tetraacrylate, pentaglycerol triacrylate, pentaerythritol diacrylate, pentaerythritol triacrylate, pentaerythritol tetraacrylate, glycerol triacrylate, dipentaerythritol triacrylate, dipentaerythritol tetraacrylate, dipentaerythritol pentaacrylate, dipentaerythritol hexaacrylate, tris (acryloyloxyethyl) isocyanurate, ethylene glycol dimethacrylate, diethylene glycol dimethacrylate, 1,6-hexanediol dimethacrylate, neopentyl glycol dimethacrylate, trimethylol propane trimethacrylate, trimethylol ethane trimethacrylate, tetramethylolmethane trimethacrylate, tetramethylolmethane tetramethacrylate, penta glycerol trimethacrylate, pentaerythritol dimethacrylate, pentaerythritol trimethacrylate, pentaerythritol tetramethacrylate, glycerine trimethacrylate, dipentaerythritol trimethacrylate, dipentaerythritol tetramethacrylate, dipentaerythritol pentamethacrylate, dipentaerythritol hexamethacrylate and active energy ray curable isocyanurate derivatives. As these multifunctional acrylates, commercially available products may be used; pentaerythritol tri/tetra acrylate (such as A-TMM-3L, made by Shin Nakamura Chemical Co., Ltd.), pentaerythritol triacrylate (PE-3A, made by kyoeisha Chemical Co., Ltd.) and the like are available. These compounds are used either singly or by mixing two or more types.

As the isocyanurate derivative of the active energy ray curable resin, a compound that has a structure where one or more ethylenically unsaturated groups are coupled to an isocyanuric acid skeleton is preferable; there is no particular restriction but a compound having three or more ethylenically unsaturated groups and one or more isocyanurate rings is preferable.

As the isocyanuric acid triacrylate compound described above, a commercially available product can also be used; examples thereof include A-9300 made by Shin Nakamura Chemical Co., Ltd. Examples of the commercially available product of the isocyanuric acid diacrylate compound include Aronix M-215 made by Toagosei Co., Ltd. Examples of the mixture of the isocyanuric acid triacrylate compound and the isocyanuric acid diacrylate compound include Aronix M-315, Aronix M-313 and the like made by Toagosei Co., Ltd. Examples of ε-caprolactone-modified active energy ray curable isocyanurate derivative include A-9300-1CL, which is ε-caprolactone-modified tris-(acryloxyethyl) isocyanurate made by Shin Nakamura Chemical Co., Ltd. and Aronix M-327 made by Toagosei Co., Ltd. but there is no restriction on these.

As the active energy ray curable resin, a monofunctional acrylate may be used. Examples of the monofunctional acrylate include isobornyl acrylate, 2-hydroxy-3-phenoxypropyl acrylate, isostearyl acrylate, benzyl acrylate, ethyl carbitol acrylate, phenoxyethyl acrylate, lauryl acrylate, isooctyl acrylate, tetrahydrofurfuryl acrylate, behenyl acrylate, 4-hydroxybutyl acrylate, 2-hydroxyethyl acrylate, 2-hydroxypropyl acrylate and cyclohexyl acrylate. Monofunctional acrylates are available such as from Shin Nakamura Chemical Co., Ltd. and Osaka Organic Chemical Industry Ltd. These compounds are used either singly or by mixing two or more types. They may be oligomers such as the dimers, trimers and the like of the monomer described above.

Furthermore, as the active energy ray curable resin, urethane acrylate may be used. As the urethane acrylate, for example, commercially available products can be used such as Beam set 575CB made by Arakawa Chemical Industries, Ltd. and UA-306H made by kyoeisha Chemical Co., Ltd.

The viscosity of the multifunctional acrylate as described above at 25° C. is preferably 3000 mPa·s or less, and is further preferably 1500 mPa·s or less. It is particularly preferably 1000 mPa·s or less. Examples of the low-viscosity resin described above include glycerin triacrylate, pentaerythritol triacrylate and pentaerythritol tetraacrylate. The viscosity mentioned above is a value that is measured under conditions of 25° C. with an E-type viscometer.

The amount of active energy ray curable resin contained in the composition of the hard coat layer is, when the entire composition is assumed to be 100 parts by mass, generally 10 to 99 parts by mass and is preferably 35 to 99 parts by mass. When a small amount of active energy ray curable resin is contained, it is difficult to sufficiently obtain the film strength of the hard coat layer. When a large amount thereof is contained, it is undesirable because a failure occurs in the uniformity of the film thickness or as a coating streak when coating is performed by a known coating method, which will be described later.

(Cation Polymerizable Compound)

The hard coat layer may further contain a cation polymerizable compound. The cation polymerizable compound is a compound that undergoes cation polymerization by the application of energy active rays and heat so as to resinify. Specific examples thereof include an epoxy group, a cyclic ether group, a cyclic acetal group, a cyclic lactone group, a cyclic thioether group, a spiroorthoester compound and a viny oxo group. Among them, a compound having a functional group such as an epoxy group or a vinyl ether group is preferably used in the present embodiment.

Examples of the cation polymerizable compound having an epoxy group or a vinyl ether group include phenyl glycidyl ether, ethylene glycol diglycidyl ether, glycerol diglycidyl ether, vinyl cyclohexene dioxide, limonene dioxide, 3,4-epoxycyclohexylmethyl-3',4'-epoxy cyclohexane carboxylate, bis-(6-methyl-3,4-epoxy cyclohexyl) adipate, 2-(3,4-epoxy cyclohexyl) ethyl trimethoxy silane, diethylene glycol divinyl ether, polyethylene glycol divinyl ether and 1,4-cyclohexane dimethanol divinyl ether. As the epoxy compound, a polymer compound can also be used.

When the cation polymerizable compound described above is included in the hard coat layer composition, and the entire composition is assumed to be 100 parts by mass, the amount of cation polymerizable compound contained in the hard coat layer composition is generally 1 to 90 parts by mass and is preferably 1 to 50 parts by mass.

(Minute Particles)

The hard coat layer may contain minute particles. As the minute particles, there are inorganic minute particles and organic minute particles. Examples of the inorganic minute particles include silica, titanium oxide, aluminum oxide, tin oxide, indium oxide, ITO, zinc oxide, zirconium oxide, magnesium oxide, calcium carbonate, calcium carbonate, talc, clay, calcined kaolin, calcined calcium silicate, hydrated calcium silicate, silicic acid aluminum, magnesium silicate and calcium phosphate. Examples of the organic minute particles include polymethacrylic acid methyl acrylate resin powder, acrylic styrene-based resin powder, polymethyl methacrylate resin powder, silicone-based resin powder, polystyrene-based resin powder, polycarbonate resin powder, benzoguanamine-based resin powder, melamine-based resin powder, polyolefin-based resin powder, polyester-based resin powder, polyamide-based resin powder, polyimide-based resin powder and polyfluorinated ethylene-based resin powder. The average particle diameter of these minute particles is preferably 30 to 200 nm in terms of the stability and the clarity of the hard coat layer coating composition. Two or more types of minute particles having different particle diameters may be contained in the hard coat layer. Since the desired pencil hardness is easily achieved, silica minute particles may be contained in the hard coat layer.

In terms of more satisfactorily achieving the action effects of the present embodiment, reactive silica particles (Xa) whose surface is processed by an organic compound having a polymerizable unsaturated group are preferably contained in the hard coat layer. The reactive silica particles (Xa) whose surface is processed by an organic compound having a polymerizable unsaturated group will be described below.

<<Reactive Silica Particles (Xa)>>

As the silica particles, known silica particles can be used. The shape thereof may be spherical or indefinite, and they are not limited to general colloidal silica and may be hollow particles, porous particles, core/shell type particles or the like; however, colloidal silica having a pH of 2.0 to 6.5 is preferable.

The dispersion medium of the silica particles is preferably water or an organic solvent. Examples of the organic solvent include: alcohols such as methanol, isopropyl alcohol, ethylene glycol, butanol and ethylene glycol mono propyl ether; ketones such as methyl ethyl ketone and methyl isobutyl ketone; aromatic hydrocarbons such as toluene and xylene; amides such as dimethylformamide, dimethylacetamide and N-methylpyrrolidone; esters such as ethyl acetate, butyl acetate and γ-butyrolactone; and ethers such as tetrahydrofuran and 1,4-dioxane. Among them, alcohols and ketones are preferable. These organic solvents can be used as the dispersion medium either singly or by mixing two or more types. Examples of the commercially available products of colloidal silica include MEK-ST-L, MEK-ST-MS, IPA-ST-L, IPA-ST-ZL and the like made by Nissan Chemical Industries, Ltd.

The reactive silica particles (Xa) can be obtained by processing the surface of the colloidal silica as described above with an organic compound (hereinafter referred to as an "organic compound (X)") having a polymerizable unsaturated group. The organic compound (X) is preferably a compound that includes a polymerizable unsaturated group and preferably an ethylenically unsaturated group and that further includes a group represented by general formula (a) below and a silanol group within the molecule or that generates a silanol group by hydrolysis.

[Chemical Formula 1]

$$-U-C(=V)-NH- \quad (a)$$

Specific six examples of [—U—C(=V)—NH—] are [—O—C(=O)—NH—], [—O—C(=S)—NH—], [—S—C(=O)—NH—], [—NH—C(=O)—NH—], [—NH—C(=S)—NH—] and [—S—C(=S)—NH—]. These groups can be used either singly or by combining two or more types. Among them, in terms of thermal stability, the [—O—C(=O)—NH—] group is preferably used together with at least one of the [—O—C(=S)—NH—] group and the [—S—C(=O)—NH—] group.

Although the ethylenically unsaturated group included in the organic compound (X) is not particularly limited, preferred examples thereof include an acryloyl group, a methacryloyl group and a vinyl group. This ethylenically unsaturated group is a constituent unit that undergoes addition polymerization with an active radical species.

Examples of the compound that generates a silanol group include compounds in which an alkoxy group, an aryloxy group, an acetoxy group, an amino group, a halogen atom and the like are bonded to a silicon atom; however, a compound in which an alkoxy group or an aryloxy group is bonded to a silicon atom, that is, alkoxysilyl group-containing compound or an aryloxysilyl group-containing compound is preferable. Specific examples thereof include a compound expressed by general formula (b) below.

[Chemical Formula 2]

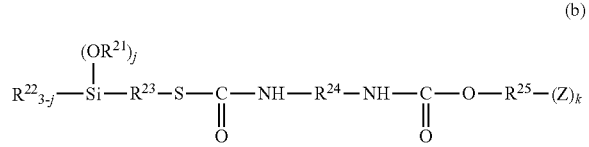

(b)

In general formula (b), $R^{21}$ and $R^{22}$ may be the same as or different from each other, and are an alkyl group or an aryl group having 1 to 8 hydrogen atoms or carbon atoms and examples thereof include a methyl group, an ethyl group, a propyl group, a butyl group, an octyl group, a phenyl group and a xylyl group. Here, j is an integer of 1 to 3.

Examples of the group represented by $[(R^{21}O)_j R^{22}{}_{3-j}Si-]$ include a trimethoxysilyl group, a triethoxysilyl group, a triphenoxysilyl group, a methyldimethoxysilyl group and a dimethylmethoxysilyl group. Among these groups, a trimethoxysilyl group, a triethoxysilyl group or the like are preferable.

$R^{23}$ is a divalent organic group that has an aliphatic or aromatic structure having 1 to 12 carbon atoms, and may include a chain-shaped, a branched or a cyclic structure. Specific examples thereof include methylene, ethylene, propylene, butylene, hexamethylene, cyclohexylene, phenylene, xylylene and dodecamethylene.

$R^{24}$ is a divalent organic group that is generally selected from divalent organic groups having a molecular weight of 14 to 10000, and that is preferably selected from divalent organic groups having a molecular weight of 76 to 500. Specific examples thereof include: chain polyalkylene groups such as hexamethylene, octamethylene and dodecamethylene; an alicyclic or polycyclic divalent organic groups such as cyclohexylene and norbornylene; divalent aromatic groups such as phenylene, naphthylene, biphenylene and polyphenylene; and alkyl group substitutes and aryl group substitutes thereof. These divalent organic groups may include an atomic group that includes elements other than carbon and hydrogen atoms, and can include a polyether bond, a polyester bond, a polyamide bond and a polycarbonate bond.

$R^{25}$ is a (k+1) valent organic group, and is preferably selected from chain-shaped, branched or cyclic saturated hydrocarbon group and unsaturated hydrocarbon group.

Z represents a monovalent organic group that has, in the molecule, a polymerizable unsaturated group which undergoes an intermolecular cross-linking reaction under the presence of an active radical species. Here, k is preferably an integer of 1 to 20, is further preferably an integer of 1 to 10 and is particularly preferably an integer of 1 to 5.

The organic compound (X) can be obtained by directly subjecting, to an addition reaction, hydrolyzable silane, one or more compounds that are selected from a polyisocyanate compound, a poly thioisocyanate compound and a compound having both an isocyanate group and a chioisoshiane group and an active hydrogen-containing polymerizable unsaturated compound having an active hydrogen atom which undergoes addition reaction with an isocyanate group or a chioisoshiane group.

Preferably, mercaptopropyl trimethoxysilane and isophorone diisocyanate are mixed under the presence of dibutyltin dilaurate, are made to react with each other at a temperature of 60 to 70° C. for about a few hours, thereafter pentaerythritol triacrylate is added and furthermore, they are made to react with each other at a temperature of 60 to 70° C. for about a few hours.

Then, the obtained organic compound (X) is mixed with the silica particles, they are made to undergo hydrolysis and both of them are bonded to each other, with the result that it is possible to manufacture the reactive silica particles (Xa).

The amount of organic compound (X) bonded to the silica particles is, when the silica particles are assumed to be 100% by mass, preferably 0.01% or more by mass, is further preferably 0.1% or more by mass and is particularly preferably 1% or more by mass.

When the amount falls within the above range, the reactive silica particles (Xa) in the composition are satisfactorily dispersed. The proportion of the silica particles in the raw material when the reactive silica particles (Xa) are manufactured is preferably 5 to 99% by mass and is further preferably 10 to 98% by mass. The amount of reactive silica particles (Xa) contained in the hard coat layer coating composition is, when the total amount of solid in the composition is assumed to be 100% by mass, preferably 5 to 80% by mass and is more preferably 10 to 80% by mass. The reactive silica particles (Xa) are used within the above range, and thus the reactive silica particles (Xa) in the hard coat layer coating composition are stably present.

Preferably, the hard coat layer contains the active energy ray curable resin and the minute particles described above, and the content mass ratio thereof is active energy ray curable resin:minute particles=90:10 to 20:80.

(Other Additives and Method of Manufacturing the Hard Coat Layer)

Preferably, in order to facilitate the curing of the active energy ray curable resin, a photopolymerization initiator is further contained in the hard coat layer. Preferably, as the amount of photopolymerization initiator contained, its mass ratio is photopolymerization initiator:active energy ray curable resin=20:100 to 0.01 to 100.

Specific examples of the photopolymerization initiator include alkylphenones, acetophenone, benzophenone, hydroxy benzophenone, Michler's ketone, α-amyloxime ester, thioxanthone and the derivatives thereof. However, the photopolymerization initiator is not limited to these. Commercially available products may be used as them; preferred examples thereof include Irgacure 184, Irgacure 907, Irgacure 651 and the like made by BASF Japan Ltd.

The hard coat layer may contain the same ultraviolet absorber as described above.

Furthermore, preferably, the hard coat layer is formed with two or more layers, and the hard coat layer in contact with the film base member contains the ultraviolet absorber in terms of satisfactorily achieving the object effects of the present embodiment and satisfactorily obtaining the film strength (scratch resistance) and the pencil hardness of the hard coat layer. Preferably, as the amount of ultraviolet absorber contained, its mass ratio is ultraviolet absorber:hard coat layer composition=0.01:100 to 10 to 100.

When two or more hard coat layers are provided, the film thickness of the hard coat layer in contact with the film base member preferably falls within a range of 0.05 to 2 μm. Two or more layers may be simultaneously stacked. The simultaneous stacking is to coat the surface of the substrate wet on wet without undergoing the dry step with two or more hard coat layers, and thus the hard coat layers are formed. The second hard coat layer is preferably stacked in layers on the first hard coat layer wet on wet without undergoing the dry step either by stacking the layers one by one with an extrusion coater or by simultaneously stacking the layers with a slot die having a plurality of slits.

As a method of producing the hard coat layer, a method of applying, drying and curing, by the following method, a hard coat layer coating composition diluted with a solvent that swells or partially dissolves a cellulose acetate film, on the cellulose acetate film, and thereby proving the hard coat layer coating composition is preferable in terms of easily obtaining interlayer intimate contact between the hard coat layer and the cellulose acetate film.

As the solvent that swells or partially dissolves the cellulose acetate film, a solvent that includes ketone and/or acetic acid ester is preferable. Specific examples of ketone include methyl ethyl ketone, acetone and cyclohexanone. Specific examples of acetic acid ester include ethyl acetate, methyl acetate and butyl acetate. The hard coat layer coating composition may include an alcohol-based solvent as another solvent.

The amount of hard coat layer coating composition applied is preferably 0.1 to 40 μm as the wet film thickness, and is further preferably 0.5 to 30 μm. Although the average film thickness is about 5 to 20 μm as the dry film thickness, and is preferably 7 to 12 μm, in the present embodiment, the amount of hard coat layer coating composition applied is preferably set such that the total film thickness of the film base member and the hard coat layer is 35 μm or less.

It is possible to form the hard coat layer by applying the hard coat coating composition forming the hard coat layer with a known application method such as a gravure coater, a dip coater, a reverse coater, a wire bar coater, a die (extrusion) coater or an inkjet method, drying after the application, applying active rays (which is also called UV curing processing) and further performing heating processing as necessary after the UV curing. The heating processing temperature after the UV curing is preferably 80° C. or more, is further preferably 100° C. or more and is particularly preferably 120° C. or more. The heating processing is performed at such a high temperature after the UV curing, and thus the mechanical strength (abrasion resistance and pencil hardness) of the hard coat layer is more satisfactory.

The drying is preferably performed by setting a temperature in a ratio reduction drying period at a high temperature equal to or more than 80° C. The drying is further preferably performed by setting the temperature in the ratio reduction drying period at a temperature equal to or more than 95° C. but equal to or less than 130° C. Since the drying processing is performed by setting the temperature in the ratio reduction drying period at a high temperature, and thus convection occurs in the applied film resin when the hard coat layer is formed, fine surface roughness is easily produced on the surface of the hard coat layer, and arithmetic average roughness Ra, which will be described later, is easily obtained.

It is known that in general, in a drying process, when the drying is started, the drying speed is changed from a constant state to a state where the drying speed is gradually reduced, and a period in which the drying speed is constant is referred to as a ratio constant drying period, and a period in which the drying speed is reduced is referred to as the ratio reduction drying period. The amount of heat flowing in in the ratio constant drying period is all consumed for the evaporation of a solvent on the applied film surface, and when the solvent on the applied film surface is lowered, the evaporation plane is moved from the surface thereinto, with the result that the period enters the ratio reduction drying period. Thereafter, since the temperature of the applied film surface is increased to approach a hot air temperature, it can be considered that the temperature of the ultraviolet-curable resin composition is increased, the viscosity of the resin is lowered and the fluidity is increased.

As the light source for the UV curing processing, as long as a light source that generates ultraviolet rays is used, there is no restriction. For example, a low pressure mercury lamp, a medium pressure mercury lamp, a high pressure mercury lamp, an ultra-high pressure mercury lamp, a carbon arc lamp, a metal halide lamp, a xenon lamp and the like can be used.

Although application conditions differ depending on each lamp, the amount of active rays applied is generally 50 to 1000 mJ/cm$^2$ and is preferably 50 to 300 mJ/cm$^2$.

When active rays are applied, it is preferable to apply active rays while applying a tension in the transport direction of the film, and it is further preferable to apply active rays while also applying a tension in the width direction. The applied tension is generally 30 to 500 N/m, and is preferably 30 to 300 N/m. A method of applying a tension is not particularly limited; a tension may be applied in the transport direction on a back roll or a tension may be applied either in the width direction at the tenter or in a biaxial direction. In this way, it is possible to obtain the film having a more excellent flatness.

In order to provide an antistatic property, a conductive agent may be contained in the hard coat layer, and as a preferred conductive agent, there are metal oxide particles and a π-conjugated conductive polymer. An ion liquid is preferably used as a conductive compound.

A fluorine-siloxane graft polymer or a silicone-based surfactant may be contained in the hard coat layer.

The fluorine-siloxane graft polymer refers to a copolymer that is obtained by grafting, to at least a fluorine-based resin, polysiloxane and/or organopolysiloxane including siloxane and/or organosiloxane alone. Examples of the commercially available product thereof include ZX-022H, ZX-007C, ZX-049, ZX-047-D and the like made by Fujikasei Kogyo Co., Ltd.

The silicone-based surfactant is a surfactant that is obtained by replacing part of a methyl group of silicone oil with a hydrophilic group. Examples of the hydrophilic group include polyether, polyglycerin, pyrrolidone, betaine, sulfate, phosphate and quaternary salt. Specific examples of the product of the silicone-based surfactant include: SH200, BY16-873 and PRX413 (dimethyl silicone oil; Toray Dow Corning Silicone Co., Ltd.); SH203, SH230 and SF8416 (alkyl-modified silicone oil; Toray Dow Corning Silicone Co., Ltd.); SF8417, BY16-208, BY16-209, BY16-849, BY16-872, FZ-2222 and FZ-2207 (dimethyl polysiloxane.polyethylene oxide linear block copolymers; FX series made by Nippon Unicar Co., Ltd.); KF-101, KF-102 and KF-105 (epoxy-modified silicone oil; made by Shin-Etsu Chemical Co., Ltd.); and BYK-UV3500, BYK-UV3510, BYK-333, BYK-331 and BYK-337 (polyether-modified silicone oil; made by BYK-Chemie Japan Ltd.). However, there is no restriction on these.

These components are preferably added to fall within a range of 0.01 to 5% by mass with respect to the solid component in the coating liquid.

(Surface Shape of the Hard Coat Layer)

The arithmetic average roughness Ra of the surface of the hard coat layer in the present embodiment is preferably 4 to 20 nm in terms of an excellent blocking prevention effect at the time of winding a long film and excellent intimate contact with the cellulose acetate film. The arithmetic average roughness Ra is a value that is measured based on the provisions of JIS B0601:1994 with an optical interference type surface roughness meter (RST/PLUS; made by WYKO Inc.).

The average distance between the concavo-convex pattern Sm in the surface of the hard coat layer is preferably 3 to 40 μm. The ratio (Ra/Sm) of the arithmetic average roughness Ra of the surface of the hard coat layer to the average distance between the concavo-convex pattern Sm in the coating surface of the hard coat layer in the cellulose acetate film (film base member) is preferably $2\times10^{-4}$ to $6\times10^{-3}$. As with the arithmetic average roughness Ra, it is possible to measure Sm based on the provisions of JIS B0601:1994 with the optical interference type surface roughness meter (RST/PLUS; made by WYKO Inc.).

In order to make the arithmetic average roughness Ra in the surface of the hard coat layer fall within the above range, it is possible to use a method of pressing a mold to form projections on the surface, a method of mixing resins having different SP values (solubility parameters) to form projections and recesses in the surface or a method of performing spinodal decomposition, nucleation or the like to form projections.

The mold roll used for the formation of the projections can be selected as necessary from molds ranging from fine projections and recesses to rough projections and recesses and can be applied; a mold in which the projections and recesses are regularly aligned in the form of a mat, a lenticular lens or a sphere or are randomly aligned can be used.

The haze value of the hard coat film of the present embodiment is preferably 1% or less because sufficient brightness and high contrast can be obtained.

<Functional Layer>

(Back Coat Layer)

On the surface on the opposite side to the side on which the hard coat layer is provided in the film base member of the present embodiment, a back coat layer for preventing curl and blocking may be provided.

In terms of preventing curl and blocking, the particles of silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate can be added.

The particles included in the back coat layer is 0.1 to 50% by mass with respect to a binder. The increase in haze when the back coat layer is provided is preferably 0.5% or less, and is particularly preferably 0.1% or less. As the binder, a cellulose ester resin is preferable. A coating composition for the formation of the back coat layer preferably contains a solvent for alcohols, ketones and/or acetic acid esters.

(Anti-Reflection Layer)

In the upper layer of the hard coat of the present embodiment, the anti-reflection layer having an external light anti-reflection function may be provided by coating. The anti-reflection layer described above corresponds to the anti-reflection layer 31 in FIG. 1.

The anti-reflection layer is preferably stacked in layers with consideration given to refractive index, film thickness, the number of layers, the order of layers such that the reflectance is reduced by optical interference. The anti-reflection layer is preferably formed with a low refractive index layer whose refractive index is lower than that of the film base member which is the support member, or by combining a high refractive index layer whose refractive index is higher than that of the support member and a low refractive index layer. Particularly preferably, the anti-reflection layer is formed with three or more refractive index layers; different three layers, a medium refractive index layer (whose refractive index is higher than that of the support member but is lower than that of the high refractive index layer)/a high refractive index layer/a lower refractive layer, are stacked in this order from the side of the support member. An anti-reflection layer is preferably used that has a layer configuration of four or more layers in which two or more high refractive index layers and two or more low refractive index layers are alternately stacked in layers.

Although as the layer configuration of the film having the anti-reflection layer, the following configurations can be considered, there is no restriction on the configurations.

Cellulose acetate film/hard coat layer/low refractive index layer

Cellulose acetate film/hard coat layer/medium refractive index layer/low refractive index layer Cellulose acetate film/hard coat layer/medium refractive index layer/high refractive index layer/low refractive index layer Cellulose acetate film/hard coat layer/high refractive index layer (conductive layer)/low refractive index layer Cellulose acetate film/hard coat layer/anti-glare layer/low refractive index layer (Low Refractive Index Layer)

The low refractive index layer preferably contains silica-based particles, and its refractive index preferably falls within a range of 1.30 to 1.45 when it is measured at 23° C. with a wavelength of 550 nm.

The film thickness of the low refractive index layer is preferably 5 nm to 0.5 µm, is further preferably 10 nm to 0.3 µm and is most preferably 30 nm to 0.2 µm.

Preferably, a composition for the formation of the low refractive index layer especially has as silica-based particles, at least one or more types of particles which have an outer shell layer and which are porous or have a cavity therewithin. In particular, the particles which have the outer shell layer and which are porous or have a cavity therewithin are preferably hollow silica-based particles.

The composition for the formation of the low refractive index layer may also contain an organic silicon compound represented by the following general formula (OSi-1) or a hydrolyzate thereof or a polycondensate thereof.

   General formula (OSi-1):

In the organic silicon compound represented by the above general formula, R in the formula represents an alkyl group having 1 to 4 carbon atoms. Specifically, tetramethoxysilane, tetraethoxysilane, tetraisopropoxysilane or the like is preferably used.

In addition, a solvent, as necessary, a silane coupling agent, a curing agent, a surfactant or the like may be added. A compound may be contained that has a thermosetting property and/or a light curing property and that is mainly formed with a fluorine-containing compound which includes fluorine atoms falling within a range of 35 to 80% by mass and which includes a crosslinkable or polymerizable functional group. Specific examples thereof include a fluorine-containing polymer and a fluorine-containing sol-gel compound. Examples of the fluorine-containing polymer include the hydrolyzate and the dehydration condensate of a perfluoroalkyl group-containing silane compound [for example, (heptadecafluoro-1,1,2,2-tetrahydrodecyl)triethoxysilane] and a fluorine-containing copolymer that has, constituent units, a fluorine-containing monomer unit and a cross-linking reactive unit. In addition, a solvent, as necessary, a silane coupling agent, a curing agent, a surfactant or the like may be added.

(High Refractive Index Layer)

The refractive index of the high refractive index layer is preferably adjusted to fall within a range of 1.4 to 2.2 when it is measured at 23° C. with a wavelength of 550 nm. The thickness of the high refractive index layer is preferably 5 nm to 1 µm, is further preferably 10 nm to 0.2 µm and is most preferably 30 nm to 0.1 µm. The adjustment of the refractive index can be performed by adding metal oxide particles or the like. The refractive index of the metal oxide particles used is preferably 1.80 to 2.60, and is further preferably 1.85 to 2.50.

The type of metal oxide particles is not particularly limited; a metal oxide having at least one type of element selected from the group consisting of Ti, Zr, Sn, Sb, Cu, Fe, Mn, Pb, Cd, As, Cr, Hg, Zn, Al, Mg, Si, P and S. The metal oxide particles may be doped with a minute number of atom such as Al, In, Sn, Sb, Nb, a halogen element, Ta or the like. The mixture thereof is also preferable. In the present embodiment, among them, at least one type of metal oxide particles selected from the group consisting of zirconium oxide, antimony oxide, tin oxide, zinc oxide, indium-tin oxide (ITO), antimony-doped tin oxide (ATO) and zinc antimonate is particularly preferably used as the main ingredient. In particular, zinc antimonate particles are preferably contained.

The average particle diameter of the primary particle of the metal oxide particles falls within a range of 10 to 200 nm, and particularly preferably falls within a range of 10 to 150 nm. The average particle diameter of the metal oxide particles can be measured with an electron micrograph by a scanning electron microscope (SEM) or the like. The average particle diameter may also be measured with a particle size distribution meter or the like utilizing a dynamic light scattering method, a static light scattering method or the like. When the particle diameter is excessively reduced, they are easily flocculated, and the dispersion property is degraded. When the particle diameter is excessively increased, it is undesirable because the haze is remarkable increased. The metal oxide particles are preferably formed in the shape of a rice grain, a sphere, a cubic, a spindle or a needle or in an indefinite shape.

The surface of the metal oxide particles may be processed by an organic compound. The surface of the metal oxide particles is modified by an organic compound, and thus the dispersion stability in an organic solvent is enhanced, the control of the diameter of the dispersed particles is made easy and it is also possible to reduce aggregation and sedimentation over time. Hence, the amount of surface modified by an organic compound is preferably 0.1 to 5% by mass with respect to the metal oxide particles and is more preferably 0.5 to 3% by mass. Examples of the organic compound used for the surface processing include polyol, alkanolamine, stearic acid, a silane coupling agent and a titanate coupling agent. Among them, a silane coupling agent is preferable. Two or more types of surface processing may be combined.

The high refractive index layer may contain a π-conjugated conductive polymer. As long as the π-conjugated conductive polymer is an organic polymer whose main chain is π-conjugated, it can be used. Examples thereof include polythiophenes, polypyrroles, polyanilines, polyphenylenes, polyacetylenes, polyphenylene vinylenes, polyacenes, polythiophene vinylenes and the copolymers thereof. In terms of ease of polymerization and stability, polythiophenes, polyanilines and polyacetylenes are preferable.

Although it is possible to obtain sufficient conductivity and solubility in a binder resin even when the π-conjugated conductive polymer does not undergo substitution, in order to more enhance the conductivity and the solubility, a functional group such as an alkyl group, a carboxy group, a sulfo group, an alkoxy group, a hydroxy group or a cyano group may be introduced.

The high refractive index layer may also contain an ionic compound. Examples of the ionic compound include compounds formed with: imidazolium-based, pyridium-based, alicyclic amine-based, aliphatic amine-based and aliphatic phosphonium-based cations; and inorganic ion-based such as $BF_4-$ and $PF_6-$ and fluorine-based such as $CF_3SO_2-$, $(CF_3SO_2)_2N-$ and $CF_3CO_2-$ anions. In the ratio between the polymer and the binder, the binder is preferably 10 to 400 mass parts with respect to 100 mass parts of the polymer, and is particularly preferably 100 to 200 mass parts with respect to the 100 mass parts of the polymer.

(Anti-Glare Layer)

On the hard coat layer, an anti-glare layer can be provided as a functional layer. The anti-glare layer is a layer that blurs the outline of an image reflected off a film surface to lower the visibility of the reflected image and that prevents the appearance of the reflected image from being noticed when an image display device such as a liquid crystal display, an organic EL display or a plasma display is used. Specifically, the anti-glare layer is preferably a layer which is adjusted by the addition of minute particles or the like to the hard coat layer, a method of pressing the mold to produce protrusions on the surface or the like such that the arithmetic average roughness Ra of the layer surface is 0.1 to 1 µm.

The proportion of a scattering reflectance (scattering reflectance ratio) in the integrated reflectance of the anti-glare layer is preferably 2 to 60%. The scattering reflectance ratio falling within the above range is controlled with minute particles or the like, and thus it is possible to enhance interlayer intimate contact between the cellulose acetate film having the degree of acetylation having high moisture permeability as described above and the anti-glare layer. More preferably, when the proportion of the scattering reflectance ratio falls within a range of 20 to 50%, it is possible to obtain more satisfactory intimate contact.

The scattering reflectance ratio can be determined by measuring SCI (integrated reflectance) and SCE (scattering reflectance) with a spectrophotometer CM-2500d made by Konica Minolta Inc. under conditions of a measurement diameter of (118 mm and an observation field of 2°.

[Adhesive Agent Layer]

The adhesive agent of the adhesive agent layer (which corresponds to the adhesive agent layer 32 of FIG. 2) used when a touch panel is adhered to a display device is not particularly limited, and a known adhesive agent can be used; although for example, an acrylic-based adhesive agent, a silicone-based adhesive agent, a urethane-based adhesive agent, a rubber-based adhesive agent, a polyester-based adhesive agent or the like can be used, an acrylic-based adhesive agent is particularly preferable because it is relatively easy to control the adhesive force and the storage elastic modulus.

Examples of the acrylic-based adhesive agent include: the copolymers between one or two or more types of acrylic acid alkyl esters having 1 to 20 carbon atoms such as methyl (meta) acrylate, ethyl (meta) acrylate, n-butyl (meta) acrylate, isobutyl (meta) acrylate, n-hexyl (meta) acrylate, 2-ethylbutyl (meta) acrylate, 2-ethylhexyl (meta) acrylate, isooctyl (meta) acrylate and decyl (meta) acrylate and functional monomers such as (meta) acrylate, itaconic acid, maleic acid, maleic anhydride, 2-hydroxyethyl (meta) acrylate and 4-hydroxybutyl (meta) acrylate copolymerizable with the acrylic acid alkyl esters are made to react with crosslinking agents such as an isocyanate-based crosslinking agent, an epoxy-based crosslinking agent, an aziridine-based crosslinking agent and a metal chelate-based crosslinking agent.

The thickness of the adhesive agent layer is preferably 1 to 13 µm. When the thickness of the adhesive agent layer is 1 µm or more, it is possible to obtain a sufficient adhesive force whereas when the thickness of the adhesive agent layer is 13 µm or less, it is possible to reduce the flowing out of glue at the time of punching processing or at the time of cutting processing, and to maintain a high pencil hardness. The thickness of the adhesive agent layer is preferably 3 to 12 µm.

As the storage elastic modulus of the adhesive agent layer, a storage elastic modulus at 0° C. is preferably $1.0 \times 10^6$ to $1.0 \times 10^8$ Pa. When the storage elastic modulus of the adhesive agent layer is $1.0 \times 10^6$ Pa or more, it is possible to obtain sufficient punching processing and cutting processing properties and a high pencil hardness whereas when the storage elastic modulus of the adhesive agent layer is $1.0 \times 10^8$ Pa or less, it is possible to obtain a sufficient adhesive force. The storage elastic modulus of the adhesive agent layer is preferably $1.5 \times 10^6$ to $1.0 \times 10^7$ Pa.

As a method of providing the adhesive agent layer on the hard coat layer, there is a method of separately coating a separation sheet with an adhesive agent-containing composition and stacking in layers, a hard coat film (the film base member+the hard coat layer) on the adhesive agent layer produced by drying. Examples of the coating method of the adhesive agent-containing composition described above include conventional known methods such as a bar coat method, a knife coat method, a roll coat method, a blade coat method, a die coat method, a gravure coat method and a curtain coat method. By directly coating the surface of the hard coat film with the adhesive agent-containing composition described above and drying it, the adhesive agent layer may be stacked in layers.

As the separation sheet described above, various types of separation sheets can be used; the separation sheet is typically formed with a base member sheet having a separation property on the surface. Examples of the base member sheet include: the films of polyester resin, polyethylene resin, polypropylene resin, polystyrene resin, polycarbonate resin and the like; and a film, synthetic paper and the like in which a filler such as a loading material is contained in these films. Examples thereof also include paper base members such as glassine paper, clay coated paper and high-quality paper.

In order to have a separation property on the surface of the base member sheet, it is preferable to adhere, on its surface, such as by coating, a separation agent such as a heat-curable silicone resin or an ultraviolet-curable silicone resin. The coating amount of separation agent is preferably 0.03 to 3.0 g/m$^2$. The separation sheet is stacked in layers such that the surface having the separation agent is in contact with the adhesive agent layer.

Example

A specific example of the present invention will be described below as an example. For comparison with the present invention, a comparative example will also be described. The present invention is not limited to the example described below.

<Production of an Optical Film A1>
<Minute Particle Dispersion Liquid 1>

| Silica minute particles (Aerosil R972V made by Nippon Aerosil Ltd.) | 11 mass parts |
| Ethanol | 89 mass parts |

They were agitated and mixed with a dissolver for 50 minutes, and were thereafter dispersed with Manton Gaulin, with the result that a minute particle dispersion liquid 1 was produced.

<Minute Particle Addition Liquid 1>

The minute particle dispersion liquid 1 was slowly added, while being sufficiently agitated, to a dissolution tank filled with methylene chloride. Furthermore, dispersion was performed with an attritor such that the particle diameter of the second particle was a predetermined size. This was filtered with Finemet NF made by Nippon Seisen Co., Ltd., and a minute particle addition liquid 1 was prepared.

| Methylene chloride | 99 mass parts |
| Minute particle dispersion liquid 1 | 5 mass parts |

<Main Dope Liquid>

A main dope liquid of the following composition was prepared. Methylene chloride and ethanol were first added to a pressurized dissolution tank. Then, cellulose acetate was put into the pressurized dissolution tank where a solvent was present while being agitated. This was heated while being agitated, and was completely dissolved. This was filtered with Azumi Filter Paper No. 244 made by Azumi Filter Paper Co., Ltd., and the main dope liquid was prepared.

| Methylene chloride | 438 mass parts |
| Ethanol | 32 mass parts |
| Cellulose acetate having an acetyl group substitution degree of 2.88 and Mn = 140000 | 90 mass parts |
| Ester-based compound 1 | 10 mass parts |
| TINUVIN 928 (made by Ciba Japan Company Ltd.) | 6 mass parts |
| Minute particle addition liquid 1 | 4 mass parts |

These were put into a hermetically sealed container, were heated while being agitated and were completely dissolved. They were filtered with Azumi Filter Paper No. 24 made by Azumi Filter Paper Co., Ltd., and the main dope liquid was prepared.

Then, with a belt cast device, they were uniformly cast to a stainless band support member. The stainless band support member was used to evaporate the solvent until the residual solvent amount reached 100%, and separation from the top of the stainless band support member was performed. The solvent was evaporated at 35° C. of the web of the cellulose acetate film, slitting was performed to have a width of 1.5 m, the width was held with a tenter and drying was performed at a drying temperature (also referred to a heat processing temperature or an elongation temperature) of 160° C. The residual solvent amount at the start of the drying was 20%.

Thereafter, while the film was being transported with a large number of rolls within the drying device at 120° C., the drying was performed for 15 minutes, and then knurling processing with a width of 15 mm and a height of 10 µm was performed on both ends of the film and the film was wound around a core, with the result that the optical film A1 was obtained. The residual solvent amount in the optical film was 0.2%, the film thickness was 25 µm and the number of turns was 3900 m.

<Production of an Optical Film A2>

As an optical film A2, KC4UA (made by Konica Minolta Advanced Layers, Inc., product name: KC4UA, thickness: 40 µm) was used.

<Production of an Optical Film A3>

As an optical film A3, a lactonization polymethyl methacrylate film having a thickness of 30 µm was used. With respect to the acrylic-based film described above, a mixture of 90 mass parts of a lactone ring structure-containing (meta) acrylic-based resin (mass ratio of copolymerization monomer; methyl methacrylate/2-(hydroxymethyl) methyl acrylic acid=8/2, a lactone cyclization rate of about 100%) and 10 mass parts of an acrylonitrile-styrene (AS) resin (Toyo AS AS20 made by Toyo Styrene Ltd.) was kneaded with a melt extruder, and a transparent pellet was obtained. The pellet was dissolved in methyl ethyl ketone, and a solution cast method was used to obtain a lactonization polymethyl methacrylate film having a thickness of 30 µm. On both surfaces of the obtained film, an easy adhesive agent composition shown below was applied such that the thickness after drying with a bar coater was 0.3 µm, and was thereafter dried at 140° C. to form a specific resin layer, with the result that the optical film A3 was obtained.

(Easy Adhesive Agent Composition)

16.8 g of polyester urethane (made by Dai-ichi Kogyo Seiyaku Co., Ltd., product name: Superflex 210, a solid content of 33%), 4.2 g of a crosslinking agent (oxazoline-containing polymer, made by Nippon Shokubai Co., Ltd., product name: EPOCROS WS-700, a solid content of 25%), 2.0 g of 1 weight % aqueous ammonia, 0.42 g of colloidal silica (made by Fuso Chemical Co., Ltd., product name: Quartron PL-3, a solid content of 20% by weight) and 76.6 g of pure water were mixed, and thus an easy adhesive agent composition was obtained.

<Production of an Optical Film A4>

As an optical film A4, a polyethylene terephthalate film (made by Mitsubishi Plastics, Inc., a thickness of 25 µm) was used.

<Production of a Hard Coat Film B1>

A hard coat layer composition below filtered with a polypropylene filter having a pore diameter of 0.4 µm was applied on the optical film A1 with an extrusion coater. Then, after drying at a temperature of 80° C., while nitrogen purging was being performed such that an atmosphere in which an oxygen concentration was 1.0% by volume or less was achieved, ultraviolet rays were applied with an ultraviolet lamp and the coating layer was cured. The illumination of the ultraviolet rays at an illumination portion at that time was 100 mW/cm$^2$, the amount of illumination was 0.25 J/cm$^2$. Then, a hard coat layer having a dry film thickness of 3 µm was formed and wound, and a hard coat film B1 in the form of a roll was produced.

<<Hard Coat Layer Composition>>

The following materials were agitated and mixed to form a hard coat layer coating composition.

| Dipentaerythritol hexaacrylate (NK ester A-DPH made by Shin-Nakamura Chemical Industry Co., Ltd.) | 30 mass parts |
| Urethane acrylate (UA-306H made by Kyoeisha Chemical Co., Ltd.) | 70 mass parts |

-continued

| | |
|---|---|
| Polyether-modified polydimethylsiloxane (BYK-UV3510 made by BYK-Chemie Japan Ltd.) | 1 mass part |
| Irgacure 184 (made by Ciba Japan Company Ltd.) | 4 mass parts |
| Isopropyl alcohol | 111 mass parts |
| Methyl ethyl ketone | 74 mass parts |

<Production of Hard Coat Films B2 to B5>

Instead of the optical film A1, the optical films A2 to A4 were used, and hard coat films B2 to B4 were obtained in the same production manner as the hard coat film B1. The hard coat film B3 was immersed in pure water for 60 seconds, was then dried in an oven at 60° C. for 60 seconds and thus the hard coat film B5 was obtained.

The relationship between the hard coat films B1 to B5, the optical films A1 to A4 used, the materials thereof and the film thickness (including the thickness of the optical films A1 to A4) of the hard coat films B1 to B5 is shown in table 1.

TABLE 1

| HC film | Film base member | HC layer | HC film thickness (μm) |
|---|---|---|---|
| B1 | A1 (TAC) | HC layer composition | 28 |
| B2 | A2 (TAC) | | 43 |
| B3 | A3 (Acryl) | | 33 |
| B4 | A4 (PET) | | 28 |
| B5 (obtained by washing B3) | A3 (Acryl) | | 33 |

[Production of a Polarization Plate]

The hard coat film B1 produced as described above was alkali-processed with 2.5 mol/L of a sodium hydroxide aqueous solution at 40° C. for 90 seconds, was washed with water for 45 seconds, was neutralized with 10 mass % of HCl at 30° C. for 45 seconds, was then washed at 30° C. for 45 seconds and was subjected to saponification processing, with the result that an alkali-processed film was obtained.

Then, a polyvinyl alcohol film having a thickness of 75 μm was swollen with water at 35° C. This film was immersed in an aqueous solution consisting of 0.075 g of iodine, 5 g of potassium iodide and 100 g of water for 60 seconds, and was then immersed in an aqueous solution consisting of 3 g of potassium iodide, 7.5 g of boric acid and 100 g of water at 45° C. The film after the immersion was uniaxially stretched at 55° C. by a stretching factor of 5. The obtained film was washed with water and was then dried, and thus a polarizer having a thickness of 35 μm was obtained.

Then, a polarization plate C1 was produced by adhering the alkali-processed film to the polarizer using a completely saponified polyvinyl alcohol 5% aqueous solution as an adhesive agent such that the hard coat layer formed a front layer on one surface of the polarizer and adhering, to the other surface, a film obtained by likewise alkali-processing the optical film A1.

In the same manner as described above, polarization plates C2 and C6 were produced with combinations shown in table 2. Polarization plates C3 to C5 and C7 were produced using adhering methods shown below.

TABLE 2

| | Display device | Polarization plate | Adhering method | Polarizer front side | Polarizer back side | HC film thickness (μm) | HC film contact angle (°) | Display unevenness 23° C. 55% RH | Display unevenness 50° C. 90% RH |
|---|---|---|---|---|---|---|---|---|---|
| Example 1 | D1 | C1 | Water glue | B1 | A1 | 28 | 55° | Excellent | Excellent |
| Comparative example 1 | D2 | C2 | Water glue | B2 | A1 | 43 | 55° | Excellent | No good |
| Comparative example 2 | D3 | C3 | UV adhesive | B3 | A1 | 33 | 80° | Fair | No good |
| Comparative example 3 | D4 | C4 | UV adhesive | B4 | A1 | 28 | 80° | Fair | No good |
| Comparative example 4 | D5 | C5 | UV adhesive | B1 | A1 | 28 | 80° | Fair | No good |
| Example 2 | D6 | C6 | Water glue | A1 | A1 | 25 | 20° | Excellent | Fair |
| Example 3 | D7 | C7 | UV adhesive | B5 | A1 | 33 | 55° | Excellent | Fair |

An adhesion layer composition shown below was applied to each of the optical film A1 and the hard coat films B1 and B3 to B5 with a micro gravure coater (gravure roll: #300, rotation speed 140%/line speed) such that the thickness after curing was 5 μm, and thus a protective film with the adhesive agent was obtained.

The protective film with the adhesive agent was adhered to both surfaces of the polarizer described above with the combinations shown in table 2 with a roll machine. Thereafter, ultraviolet rays were applied from both sides to cure the adhesive agent. The line speed was set at 20 m/min, and the cumulative amount of ultraviolet rays applied to the protective film was each set at 200 mJ/cm$^2$. In this way, the polarization plates C3 to C5 and C7 were obtained.

[Production of a Display Device with a Touch Panel (without any Air Gap)]

From a commercially available liquid crystal display device with a touch panel (GALAXY S III, made by Samsung Co., Ltd.), a touch panel module and a polarization plate adhered to a liquid crystal cell (liquid crystal panel) on the side of the touch panel module were carefully separated.

Then, the liquid crystal cell was adhered through an acryl-based adhesive agent to the polarization plate C1 produced as described above, and thus a liquid crystal display device was produced.

SVR1240 made by Sony Chemical & Information Device Corp. was applied to the surface of the hard coat film B1 of the liquid crystal display device produced as described above, and thus an adhesive agent layer was formed.

Then, through the applied SVR1240, the liquid crystal display device produced as described above and the touch panel were adhered, ultraviolet rays were applied to part thereof and they were tentatively fixed. Whether or not bubbles were produced at the interface was inspected, then ultraviolet rays were applied overall, curing was completely performed and the liquid crystal display device and the touch panel were actually fixed, with the result that the display device with the touch panel D1 was obtained.

In the same manner as described above, an adhesive agent layer was formed on the polarization plates C2 to C7 of the liquid crystal display device, and the touch panel and the liquid crystal display device were adhered through the adhesive agent layer, with the result that the display devices with the touch panel D2 to D7 were obtained.

(Production of Polarization Plates)

As with the polarization plates C1 to C7, the polarizer having a thickness of 35 μm and produced under the same conditions as described previously was used to adhere the anti-reflection films E1 to E5 to the polarizer with combinations shown in table 4, with the result that polarization plates C8 to C13 were produced.

TABLE 4

|  | Display device | Polarization plate | Adhering method | Polarizer front side | Polarizer back side | HC film thickness (μm) | HC film contact angle (°) | Display unevenness 23° C. 55% RH | Display unevenness 50° C. 90% RH |
|---|---|---|---|---|---|---|---|---|---|
| Example 4 | D8 | C8 | Water glue | E1 | A1 | 28 | 55° | Excellent | Excellent |
| Comparative example 5 | D9 | C9 | Water glue | E2 | A1 | 43 | 55° | Excellent | No good |
| Comparative example 6 | D10 | C10 | UV adhesive | E3 | A1 | 33 | 80° | Fair | No good |
| Comparative example 7 | D11 | C11 | UV adhesive | E4 | A1 | 28 | 80° | Fair | No good |
| Comparative example 8 | D12 | C12 | UV adhesive | E1 | A1 | 28 | 80° | Fair | No good |
| Example 5 | D13 | C13 | UV adhesive | E5 | A1 | 33 | 55° | Excellent | Fair |

[Production of a Display Device with a Touch Panel (with Air Gaps)]

<<Low Refractive Index Layer Composition>>

A fluorine polymer (molecular weight 1000000), 80 parts by weight of low refractive index nano-particles with respect to 100 parts by weight of the fluorine polymer, 40 parts by weight of an acryl monomer (molecular weight 1000) with respect to 100 parts by weight of the fluorine polymer, 1 part by weight of a fluorine-based additive with respect to 100 parts by weight of the fluorine polymer and 1 part by weight of a silicone-based additive with respect to 100 parts by weight of the fluorine polymer were combined to prepare a liquid, and MIBK (methyl isobutyl ketone):t-BuOH (t-butyl alcohol):cyclohexanone=20:55:25 was added, with the result that a 3.5 wt % low refractive index layer composition was produced.

(Production of Anti-Reflection Films)

On the hard coat films B1 to B5 described above, the low refractive index layer composition produced as described above was applied, and was dried at an oven at 80° C. for 40 seconds such that the film thickness was 100 nm. After the drying, an ultraviolet application device (Fusion UV Systems Japan, light source H valve) was used under nitrogen purging, and ultraviolet rays were applied at an application dose of 380 mJ/m$^2$, the low refractive index layer composition was cured and a low refractive index layer was produced, with the result that anti-reflection films (LR (Low Reflection) film) E1 to E5 were produced.

A relationship between the anti-reflection films E1 to E5, the hard coat films B1 to B5 used and the film thickness thereof is shown in table 3.

TABLE 3

| LR film | HC film | Low refractive index layer | HC film thickness (μm) |
|---|---|---|---|
| E1 | B1 | Low refractive index layer composition | 28 |
| E2 | B2 | | 43 |
| E3 | B3 | | 33 |
| E4 | B4 | | 28 |
| E5 | B5 | | 33 |

(Adherence)

From a commercially available liquid crystal display device with a touch panel (iPad II, made by Apple, Ltd.), a touch panel module and a polarization plate adhered to a liquid crystal cell were carefully separated.

Then, the liquid crystal cell was adhered through an acryl-based adhesive agent to the polarization plates C8 to C13 produced as described above, and thus a liquid crystal display device was produced.

Then, an optical adhesive tape (having a thickness of 0.025 mm, made by Nitto Denko Co., Ltd.) was adhered to the edge portion of the liquid crystal display device described above, and the liquid crystal display device and the touch panel were adhered, with the result that the display devices with the touch panel D8 to D13 were obtained.

[Measurement of a Contact Angle]

In samples obtained by performing wet heat processing at a temperature of 23° C. and 55% RH (relative humidity) for 24 hours on each of the hard coat films produced as described above, a contact angle on the surface (the surface on the side of the touch panel) of each film was measured with a contact angle meter CA-A (made by Kyowa Interface Science Co., Ltd.). In the measurement of the contact angle, pure water was used, and the droplet diameter was set at 1.0 mm under the temperature and humidity described above, and the contact angle was measured.

20 samples with a size of 30 mm×40 mm were randomly sampled from the individual films produced, and on the surface of each sample, the contact angle was measured by the method described above, with the result that the average value of the measurements of 20 samples of the individual films was adopted.

[Measurement of Display Unevenness]

Wet heat processing was performed on each of the display devices D1 to D13 produced as described under the environment of 23° C. and 55% RH for 24 hours. Thereafter, a backlight was turned on for 2 hours, and then the maximum brightness and the minimum brightness at the time of black display were measured with a brightness distribution measurement device (manufactured by Konica Minolta Inc, product name "CA-1500").

The maximum brightness and the minimum brightness were measured as follows. Specifically, the display screen of the liquid crystal display device was divided into a total of 9 partitions of 3 partitions horizontally×3 partitions vertically. Then, the brightness in the partition in the center was set at the minimum brightness, and the highest brightness among the total partitions (9 partitions) was set at the maximum brightness. The obtained maximum brightness was divided by the minimum brightness, and thus a black brightness ratio was calculated (black brightness ratio=maximum brightness/minimum brightness). Then, display unevenness was evaluated based on the following criteria.

Excellent: the black brightness ratio was less than 1.50

Fair: the black brightness ratio was equal to or more than 1.50 but is less than 2.00

No good: the black brightness ratio was equal to or more than 2.00

Wet heat processing was performed on the obtained display devices D1 to D13 under the environment of 50° C. and 90% RH for 24 hours. Thereafter, the black brightness ratio was measured in the same manner as described above, and display unevenness was evaluated.

A correlation between the display devices D1 to D13 and examples (or comparative examples) is shown as in tables 2 and 4.

[Evaluation Results]

With respect to the display devices D1, D6 to D8 and D13, the contact angle on the surface of the hard coat film was 60° or less, and since the adhesion of the anti-reflection film or the adhesive agent layer to the film surface was enhanced, all evaluations of the display unevenness after the wet heat processing under the environment of 23° C. and 55% RH were excellent. Since in these display devices, the evaluations of the display unevenness after the wet heat processing under the environment of 50° C. and 90% RH were either excellent or fair, the film thickness of the hard coat film was so thin as to be 35 µm and thus the warpage of the film after heating was reduced, with the result that it is estimated that this further reduced the separation of the anti-reflection film and the adhesive agent layer.

On the other hand, since in the other display devices D2 to D5 and D9 to D12, at least one of the conditions "the film thickness of the hard coat film was equal to or less than 35 µm" and "the contact angle on the surface of the hard coat film was less than 60°" was not satisfied, the evaluations of the display unevenness included no good.

Hence, it can be said that the film thickness of the hard coat film was equal to or less than 35 µm and the contact angle on the surface was less than 60°, and thus the adhesion of the anti-reflection film or the adhesive agent layer to the hard coat film was enhanced, and it was possible to reduce display unevenness caused by the separation thereof, with the result that it was possible to prevent the decrease in the visibility of the display device. In particular, the film thickness of the hard coat film was equal to or less than 35 µm and thus it is possible to sufficiently reduce the thickness of the polarization plate, with the result that it is possible to sufficiently contribute to the reduction in the thickness of the display device and the reduction in the weight thereof.

Since with respect to the evaluations of the display unevenness after the wet heat processing under the environment of 50° C. and 90% RH, when the film thickness of the hard coat film was 33 µm and the contact angle on the surface was 55°, the evaluations were either excellent or fair whereas when the film thickness of the hard coat film was 43 µm and the contact angle on the surface was 80°, the evaluations were no good, it can be considered that the upper limit of the film thickness of the hard coat film was 35 µm, which was between 33 µm and 43 µm and was close to 33 µm, and it can be considered that the upper limit of the contact angle was 60°, which was between 55° and 80° and was close to 60°. It can be said from tables 2 and 4 that in order to reduce display unevenness, the film thickness of the hard coat film is preferably equal to or less than 33 µm and is more preferably equal to or less than 28 µm, and that the contact angle on the surface of the hard coat film is preferably equal to or less than 55°.

INDUSTRIAL APPLICABILITY

The present invention can be utilized when a touch panel is fitted through an anti-reflection layer or an adhesive agent layer to the front surface of a liquid crystal display device or an organic EL television set.

LIST OF REFERENCE SYMBOLS 1 display panel
2 polarization plate
3 polarizer
4 film
10 display device
20 touch panel
31 anti-reflection layer
32 adhesive agent layer

The invention claimed is:

1. A display device with a touch panel, the display device having a polarization plate display panel, in which the touch panel is fitted through an anti-reflection layer or an adhesive agent layer to the display device, on a side of the polarization plate, where the polarization plate is stacked in layers on the display panel,
    wherein the polarization plate includes a polarizer and a first film which is stacked in layers on the polarizer on a side of the touch panel and whose film thickness is equal to or less than 35 µm, and
    a contact angle on a surface of the first film on the side of the touch panel is less than 60°.

2. The display device with a touch panel according to claim 1,
    wherein the film thickness of the first film is equal to or less than 33 µm, and the contact angle on the first film is equal to or less than 55°.

3. The display device with a touch panel according to claim 1,
    wherein the film thickness of the first film is equal to or less than 28 µm, and the contact angle on the first film is equal to or less than 55°.

4. The display device with a touch panel according to claim 1,
    wherein a front layer of the first film on the side of the touch panel is an acrylic resin layer, and
    the acrylic resin layer is formed with a coating composition which includes a multifunctional acrylic, a urethane prepolymer and a reactive silica particle.

5. The display device with a touch panel according to claim 1,
    wherein the first film includes cellulose.

6. The display device with a touch panel according to claim 1,
    wherein the first film include: an ester compound having a structure obtained by reaction of phthalic acid, adipic acid and at least one type of benzene monocarboxylic acid with at least one type of alkylene glycol having 2 to 12 carbon atoms; and a cellulose triacetate having an acetyl group substitution degree of 2.80 to 2.95 and a number average molecular weight equal to or more than 125000 but less than 155000.

7. The display device with a touch panel according to claim 1,
wherein the first film is a hard coat film in which a hard coat layer is stacked in layers on a film base member.

8. The display device with a touch panel according to claim 1, wherein the polarization plate further includes a second film on a side of the display panel.

9. The display device with a touch panel according to claim 8, wherein each of the first film and the second film include thermoplastic resin or a thermosetting resin.

* * * * *